United States Patent
Yi et al.

(10) Patent No.: US 9,967,816 B2
(45) Date of Patent: May 8, 2018

(54) METHOD AND DEVICE FOR TRANSMITTING DATA

(71) Applicant: Huawei Device Co., Ltd., Shenzhen (CN)

(72) Inventors: Qiang Yi, Beijing (CN); Hui Jin, Beijing (CN); Guodong Xue, Shenzhen (CN); Jun Zhang, Beijing (CN); Na Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 201 days.

(21) Appl. No.: 14/577,259

(22) Filed: Dec. 19, 2014

(65) Prior Publication Data
US 2015/0103721 A1 Apr. 16, 2015

Related U.S. Application Data

(63) Continuation of application No. PCT/CN2013/082329, filed on Aug. 27, 2013.

(30) Foreign Application Priority Data

Aug. 27, 2012 (CN) .......................... 2012 1 0307890
Sep. 18, 2012 (CN) .......................... 2012 1 0346533

(51) Int. Cl.
*H04W 52/02* (2009.01)
*H04L 29/08* (2006.01)
(Continued)

(52) U.S. Cl.
CPC ......... *H04W 52/0212* (2013.01); *H04L 67/32* (2013.01); *H04W 4/005* (2013.01); *H04W 76/045* (2013.01); *Y02B 60/50* (2013.01)

(58) Field of Classification Search
CPC .... H04W 92/12; H04B 7/2681; H04L 1/1819; H04L 1/1835
See application file for complete search history.

(56) References Cited

U.S. PATENT DOCUMENTS 9,755,882 B2 * 9/2017 Jain ..................... H04L 27/2675
2005/0249227 A1 11/2005 Wang et al.
(Continued)

FOREIGN PATENT DOCUMENTS

CN 101361280 A 2/2009
CN 102056136 A 5/2011
(Continued)

OTHER PUBLICATIONS

"3rd Generation Partnership Project; Technical Specification Group Services and System Aspects; System Improvements for Machine-Type Communications(Release 11)," 3GPP TR 23.888, V1.7.0, pp. 1-165, 3rd Generation Partnership Project, Valbonne, France (Aug. 2012).

(Continued)

*Primary Examiner* — Chandrahas B Patel
(74) *Attorney, Agent, or Firm* — Leydig, Voit & Mayer, Ltd.

(57) ABSTRACT

Embodiments of the present invention provide a method and device for transmitting data. The method includes: determining, after receiving a first message sent by a user equipment, whether first indication information is set, where the first indication information indicates that a server buffers downlink data to be sent to the user equipment; and when determining that the first indication information is set, retaining a signaling connection to the user equipment, and triggering the server that buffers the downlink data to send the downlink data to the user equipment. The method and (Continued)

device for transmitting data according to the embodiments of the present invention can save power of a user equipment.

16 Claims, 16 Drawing Sheets

(51) Int. Cl.
*H04W 76/04* (2009.01)
*H04W 4/00* (2018.01)

(56) References Cited

U.S. PATENT DOCUMENTS

| | | | |
|---|---|---|---|
| 2006/0252449 A1* | 11/2006 | Ramesh | H04W 52/44 455/522 |
| 2008/0076432 A1* | 3/2008 | Senarath | H04W 36/18 455/442 |
| 2008/0146253 A1 | 6/2008 | Wentink | |
| 2014/0148158 A1* | 5/2014 | Cho | H04W 28/14 455/435.1 |
| 2014/0161013 A1 | 6/2014 | Frenger et al. | |

FOREIGN PATENT DOCUMENTS

| | | |
|---|---|---|
| CN | 102149173 A | 8/2011 |
| CN | 102395118 A | 3/2012 |
| WO | 2011052136 A1 | 5/2011 |

OTHER PUBLICATIONS

"3$^{rd}$ Generation Partnership Project; Technical Specification Group Services and System Aspects; Machine-Type and Other Mobile Data Applications Communications Enhancements(Release 12)," 3GPP TR 23.887, V0.2.1, pp. 1-32, , 3$^{rd}$ Generation Partnership Project, Valbonne, France (Aug. 2012).

"3$^{rd}$ Generation Partnership Project; Technical Specification Group Services and System Aspects; Architecture enhancements to facilitate communications with packet data networks and applications (Release 11)," 3GPP TS 23.682, V11.1.0, pp. 1-27, 3$^{rd}$ Generation Partnership Project, Valbonne, France (Jun. 2012).

* cited by examiner

100

After receiving a first message sent by a user equipment, determine whether first indication information is set, where the first indication information indicates that a server buffers downlink data to be sent to the user equipment — S110

When determining that the first indication information is set, retain a signaling connection to the user equipment, and trigger the server that buffers the downlink data to send the downlink data to the user equipment — S120

Send a first message to a core network control entity — S210

When receiving a third message that includes third indication information and is sent by the core network entity according to the first message, disable a receiver or enter a power saving mode or shut down, where the third indication information indicates that a server has no downlink data to be sent to the user equipment — S220

Send first indication information to a core network control entity, where the first indication information indicates that a server buffers downlink data to be sent to a user equipment and indicates a data volume of the downlink data, so that the core network control entity stores the first indication information — S510

When receiving a request for acquiring the downlink data, where the request is sent by the core network control entity after the core network control entity receives a first message sent by the user equipment and when the core network control entity determines, according to the first indication information, that the data volume of the downlink data is within a range that can be borne by a second message, send a second message carrying the downlink data to the core network control entity, so that the core network control entity sends the second message carrying the downlink data to the user equipment — S520

FIG. 5

METHOD AND DEVICE FOR TRANSMITTING DATA

CROSS-REFERENCE TO RELATED APPLICATIONS

This application is a continuation of International Patent Application No. PCT/CN2013/082329, filed on Aug. 27, 2013, which claims priority to Chinese Patent Application No. 201210307890.1, filed on Aug. 27, 2012 and Chinese Patent Application No. 201210346533.6, filed on Sep. 18, 2012, all of which are hereby incorporated by reference in their entireties.

TECHNICAL FIELD

Embodiments of the present invention relate to the communications field, and more specifically, relate to a method and device for transmitting data, where the device for transmitting data includes a core network control entity, a user equipment, and a server.

BACKGROUND

With the development of communications technologies, reducing power consumption of communications devices is becoming increasingly important. In the prior art, there is a power saving solution for a user equipment, where the solution provides a condition for triggering a server to send downlink data to a user equipment in a scenario in which the server sends data to the user equipment, thereby achieving an effect of saving power of the user equipment. A specific process is as follows:

The user equipment initiates a tracking area update (Tracking Area Update, "TAU" for short)/routing area update (Routing Area Update, "RAU" for short) request and starts to execute a TAU/RAU process; after receiving the TAU/RAU request, a core network control entity (for example, a mobility management entity (Mobility Management Entity, "MME" for short) or a serving general packet radio service support node (Serving General Packet Radio Service Support Node, "SGSN" for short)) indicates to the server (for example, a services capability server (Services Capability Server, "SCS" for short) or a machine type communication (Machine Type Communication, "MTC" for short) server) that the user equipment has sent the TAU/RAU request and instructs the server to send buffered downlink data to the user equipment; and the server sends the buffered downlink data to the user equipment according to the instruction of the core network control entity.

However, in this solution, each time receiving a TAU/RAU request sent by a user equipment (for example, an MTC device), a core network control entity needs to notify a server; and apparently, regardless of whether the server has downlink data to be sent to the user equipment, the user equipment needs to enable a receiver or a wireless module to wait for the downlink data of the server. Therefore, if the server has no data to be sent to the user equipment, time for the user equipment to wait is wasted. Especially for a user equipment that sends a TAU/RAU message frequently, waiting for multiple times is extremely adverse to power saving for the user equipment.

SUMMARY

Embodiments of the present invention provide a method, core network control entity, user equipment, and server for transmitting data, which can achieve an effect of saving power of a user equipment.

According to a first aspect, a method for transmitting data is provided, including:

determining, after receiving a first message sent by a user equipment, whether first indication information is set, where the first indication information indicates that a server buffers downlink data to be sent to the user equipment; and when determining that the first indication information is set, retaining a signaling connection to the user equipment, and triggering the server that buffers the downlink data to send the downlink data to the user equipment.

With reference to the first aspect, in a first possible implementation manner of the first aspect, the triggering the server that buffers the downlink data to send the downlink data to the user equipment includes:

sending a downlink data delivery request message to the server that buffers the downlink data, so as to trigger the server that buffers the downlink data to send the downlink data to the user equipment; or includes:

sending a first user equipment reachability notification message to a home subscriber server or home location register to which the user equipment belongs, so that the home subscriber server or the home location register sends a second user equipment reachability notification message to the server that buffers the downlink data, so as to trigger the server that buffers the downlink data to send the downlink data to the user equipment.

With reference to the first aspect or the first possible implementation manner of the first aspect, in a second possible implementation manner of the first aspect, the retaining a signaling connection to the user equipment includes:

sending a second message including second indication information to the user equipment, where the second indication information indicates that there is data to be sent to the user equipment, so as to retain the signaling connection to the user equipment.

With reference to the second possible implementation manner of the first aspect, in a third possible implementation manner of the first aspect, the sending a second message including second indication information to the user equipment includes:

when duration, preset for the user equipment, in which a signaling connection can be retained is less than a predetermined threshold, sending the second message to the user equipment.

With reference to the first possible implementation manner of the first aspect, the second possible implementation manner of the first aspect, or the third possible implementation manner of the first aspect, in a fourth possible implementation manner of the first aspect, the method further includes:

when determining that the first indication information is not set, sending a third message including third indication information to the user equipment, where the third indication information indicates that there is no downlink data to be sent to the user equipment, so that the user equipment disables a receiver or enters a power saving mode or shuts down according to the third indication information.

With reference to the second possible implementation manner of the first aspect or the third possible implementation manner of the first aspect, in a fifth possible implementation manner of the first aspect, the second indication information further includes address information of the server.

With reference to the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, before the determining, after receiving a first message sent by a user equipment, whether first indication information is set, the method further includes:

when the user equipment is a time-controlled user equipment, determining whether the current time is within a range of allowed communication time, where the determining whether first indication information is set includes:

when determining that the current time is within the range of allowed communication time of the user equipment, determining whether the first indication information is set.

With reference to the first possible implementation manner of the first aspect, the second possible implementation manner of the first aspect, the third possible implementation manner of the first aspect, the fourth possible implementation manner of the first aspect, the fifth possible implementation manner of the first aspect or the sixth possible implementation manner of the first aspect, in a seventh possible implementation manner of the first aspect, before the determining whether first indication information is set, the method further includes:

receiving a second user equipment reachability notification request message that is sent by the home subscriber server or home location register to which the user equipment belongs after the home subscriber server or home location register receives a first user equipment reachability notification request message, and setting the first indication information according to the second user equipment reachability notification request message; or receiving data buffering indication information sent by the server that buffers the downlink data, where the data buffering indication information indicates that the server buffers the downlink data to be sent to the user equipment, and setting the first indication information according to the data buffering indication information.

With reference to the first possible implementation manner of the first aspect, the second possible implementation manner of the first aspect, the third possible implementation manner of the first aspect, the fourth possible implementation manner of the first aspect, the fifth possible implementation manner of the first aspect or the sixth possible implementation manner of the first aspect, in an eighth possible implementation manner of the first aspect, before the determining whether first indication information is set, the method further includes:

receiving a context response message sent by a source core network control entity serving the user equipment; and when the context response message includes the first indication information, setting the first indication information.

With reference to the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect or the eighth possible implementation manner of the first aspect, in a ninth possible implementation manner of the first aspect, before the determining, after receiving a first message sent by a user equipment, whether first indication information is set, the method further includes:

when determining, according to the first indication information, that a validity period of the downlink data expires, deleting the first indication information, where the first indication information is further used to indicate the validity period of the downlink data, and the validity period, indicated by the first indication information, of the downlink data is set according to a validity period, of the downlink data, carried in the data buffering indication information sent by the server that buffers the downlink data; or includes:

receiving a fourth message that is sent, after a validity period of the downlink data expires, by the server that buffers the downlink data, where the fourth message is used as an instruction to delete the first indication information, and deleting the first indication information according to the fourth message; or includes:

receiving a first user equipment reachability notification cancellation message sent by the home subscriber server or home location register to which the user equipment belongs, and deleting the first indication information according to the first user equipment reachability notification cancellation message.

With reference to the ninth possible implementation manner of the first aspect, in a tenth possible implementation manner of the first aspect, the receiving a first user equipment reachability notification cancellation message sent by the home subscriber server or home location register to which the user equipment belongs includes:

receiving the first user equipment reachability notification cancellation message that is sent by the home subscriber server or the home location register according to a second user equipment reachability notification cancellation message sent by the server that buffers the downlink data of the user equipment; or includes:

receiving the first user equipment reachability notification cancellation message that is sent by the home subscriber server or the home location register after the home subscriber server or the home location register determines, according to the first user equipment reachability notification request message, that the downlink data expires, where the first user equipment reachability notification request message carries the validity period of the downlink data.

With reference to the second possible implementation manner of the first aspect or the third possible implementation manner of the first aspect, in an eleventh possible implementation manner of the first aspect, the method further includes:

after receiving a downlink data notification message or downlink data sent by the server that buffers the downlink data, establishing an evolved universal terrestrial radio access network radio access bearer corresponding to a bearer for transmitting a corresponding data packet or establishing a radio access bearer corresponding to a Packet Data Protocol context for transmitting a corresponding data packet; or establishing a user plane bearer or a Packet Data Protocol context.

According to a second aspect, a method for transmitting data is provided, including:

sending a first message to a core network control entity; and when receiving a third message that includes third indication information and is sent by the core network control entity according to the first message, disabling a receiver or entering a power saving mode or shutting down, where the third indication information indicates that a server has no downlink data to be sent to a user equipment.

With reference to the second aspect, in a first possible implementation manner of the second aspect, the method further includes:

when receiving a second message that includes second indication information and is sent by the core network control entity according to the first message, retaining an established signaling connection, so as to wait to receive downlink data, where the second indication information indicates that the server has downlink data to be sent to the user equipment.

With reference to the second aspect or the first possible implementation manner of the second aspect, in a second possible implementation manner of the second aspect, when the method includes the retaining, when receiving a second message that includes second indication information and is sent by the core network control entity according to the first message, an established signaling connection, the method further includes:

when a current access network is a general packet radio service technology network, determining whether a Packet Data Protocol context is reserved; and when no Packet Data Protocol context is reserved, initiating a Packet Data Protocol context process, so as to establish a Packet Data Protocol context.

According to a third aspect, a method for transmitting data is provided, including:

sending a first user equipment reachability notification request message to a home subscriber server or home location register to which a user equipment belongs, so that the home subscriber server or the home location register sends a second user equipment reachability notification request message to a core network control entity to which the user equipment belongs, and therefore the core network control entity sets first indication information according to the second user equipment reachability notification request message, where the first indication information indicates that a server buffers downlink data to be sent to the user equipment, and the server sends the downlink data to the user equipment when receiving a second user equipment reachability notification message that is sent by the home subscriber server or the home location register after the home subscriber server or the home location register receives a first user equipment reachability notification message that is sent by the core network control entity according to the first indication information; or sending data buffering indication information to a core network control entity to which a user equipment belongs, so that the core network control entity sets first indication information according to the data buffering indication information, where the data buffering indication information indicates that a server buffers downlink data to be sent to the user equipment and the first indication information indicates that the server buffers the downlink data to be sent to the user equipment, and the server sends the downlink data to the user equipment when receiving a downlink data delivery request message that is sent by the core network control entity according to the first indication information.

With reference to the third aspect, in a first possible implementation manner of the third aspect, when the method includes the sending a first user equipment reachability notification request message to a home subscriber server or home location register, the method further includes: when determining that the downlink data expires, sending a second user equipment reachability notification cancellation message to the home subscriber server or the home location register, so that the home subscriber server or the home location register sends a first user equipment reachability notification cancellation message to the core network control entity, and therefore the core network control entity deletes the first indication information according to the first user equipment reachability notification cancellation message; or the first user equipment reachability notification request message further includes a validity period of the downlink data, so that the home subscriber server sends a first user equipment reachability notification cancellation message to the core network control entity when determining, according to the first user equipment reachability notification request message, that the validity period of the downlink data expires, and therefore the core network control entity deletes the first indication information according to the first user equipment reachability notification cancellation message.

With reference to the third aspect, in a second possible implementation manner of the third aspect, when the method includes the sending data buffering indication information to a core network control entity, the method further includes: when determining that a validity period of the downlink data expires, sending a fourth message to the core network control entity, where the fourth message is used to instruct the core network control entity to delete the first indication information; or the data buffering indication information further includes a validity period of the downlink data, so that the core network control entity sets the first indication information that is further used to indicate the validity period of the downlink data, and deletes the first indication information when the validity period of the downlink data expires.

According to a fourth aspect, a core network control entity is provided, including:

a first determining unit, configured to: after receiving a first message sent by a user equipment, determine whether first indication information is set, where the first indication information indicates that a server buffers downlink data to be sent to the user equipment;

a triggering unit, configured to: when the first determining unit determines that the first indication information is set, trigger the server that buffers the downlink data to send the downlink data to the user equipment; and a retaining unit, configured to: when the first determining unit determines that the first indication information is set, retain a signaling connection to the user equipment, so as to wait to send the downlink data to the user equipment.

With reference to the fourth aspect, in a first possible implementation manner of the fourth aspect, the triggering unit is specifically configured to:

send a downlink data delivery request message to the server that buffers the downlink data, so as to trigger the server that buffers the downlink data to send the downlink data to the user equipment; or the triggering unit is specifically configured to:

send a first user equipment reachability notification message to a home subscriber server or home location register to which the user equipment belongs, so that the home subscriber server or the home location register sends a second user equipment reachability notification message to the server that buffers the downlink data, so as to trigger the server that buffers the downlink data to send the downlink data to the user equipment.

With reference to the fourth aspect or the first possible implementation manner of the fourth aspect, in a second possible implementation manner of the fourth aspect, the retaining unit is specifically configured to:

send a second message including second indication information to the user equipment, where the second indication information indicates that there is data to be sent to the user equipment, so as to retain the signaling connection to the user equipment.

With reference to the second possible implementation manner of the fourth aspect, in a third possible implementation manner of the fourth aspect, the retaining unit is specifically configured to:

when duration, preset for the user equipment, in which a signaling connection can be retained is less than a predetermined threshold, send the second message to the user equipment.

With reference to the first possible implementation manner of the fourth aspect, the second possible implementation manner of the fourth aspect, or the third possible implementation manner of the fourth aspect, in a fourth possible implementation manner of the fourth aspect, the core network control entity further includes:

a first sending unit, configured to: when it is determined that the first indication information is not set, send a third message including third indication information to the user equipment, where the third indication information indicates that there is no downlink data to be sent to the user equipment, so that the user equipment disables a receiver or enters a power saving mode or shuts down according to the third indication information.

With reference to the second possible implementation manner of the fourth aspect or the third possible implementation manner of the fourth aspect, in a fifth possible implementation manner of the fourth aspect, the second indication information further includes address information of the server.

With reference to the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner of the fourth aspect, the core network control entity further includes:

a second determining unit, configured to: when the user equipment is a time-controlled user equipment, determine whether the current time is within a range of allowed communication time, where the first determining unit is specifically configured to:

when the second determining unit determines that the current time is within the range of allowed communication time of the user equipment, determine whether the first indication information is set.

With reference to the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, or the sixth possible implementation manner of the fourth aspect, in a seventh possible implementation manner of the fourth aspect, the core network control entity further includes:

a first receiving unit, configured to receive a second user equipment reachability notification request message that is sent by the home subscriber server or home location register to which the user equipment belongs after the home subscriber server or home location register receives a first user equipment reachability notification request message, and a first setting unit, configured to set the first indication information according to the second user equipment reachability notification request message received by the first receiving unit; or includes:

a second receiving unit, configured to receive data buffering indication information sent by the server that buffers the downlink data, where the data buffering indication information indicates that the server buffers the downlink data to be sent to the user equipment, and a second setting unit, configured to set the first indication information according to the data buffering indication information.

With reference to the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, or the sixth possible implementation manner of the fourth aspect, in an eighth possible implementation manner of the fourth aspect, the core network control entity further includes:

a third receiving unit, configured to receive a context response message sent by a source core network control entity serving the user equipment; and a third setting unit, configured to: when the context response message received by the third receiving unit includes the first indication information, set the first indication information.

With reference to the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, or the eighth possible implementation manner of the fourth aspect, in a ninth possible implementation manner of the fourth aspect, the core network control entity further includes:

a first deleting unit, configured to: when determining, according to the first indication information, that a validity period of the downlink data expires, delete the first indication information, where the first indication information is further used to indicate the validity period of the downlink data, and the validity period, indicated by the first indication information, of the downlink data is set according to a validity period, of the downlink data, carried in the data buffering indication information sent by the server that buffers the downlink data; or includes:

a fourth receiving unit, configured to receive a fourth message that is sent, after a validity period of the downlink data expires, by the server that buffers the downlink data, where the fourth message is used as an instruction to delete the first indication information, and a second deleting unit, configured to delete the first indication information according to the fourth message received by the fourth receiving unit; or includes:

a fifth receiving unit, configured to receive a first user equipment reachability notification cancellation message sent by the home subscriber server or home location register to which the user equipment belongs, and a third deleting unit, configured to delete the first indication information according to the first user equipment reachability notification cancellation message received by the fifth receiving unit.

With reference to the ninth possible implementation manner of the fourth aspect, in a tenth possible implementation manner of the fourth aspect, the fifth receiving unit is specifically configured to:

receive the first user equipment reachability notification cancellation message that is sent by the home subscriber server or the home location register according to a second user equipment reachability notification cancellation message sent by the server that buffers the downlink data of the user equipment; or receive the first user equipment reachability notification cancellation message that is sent by the home subscriber server or the home location register after the home subscriber server or the home location register determines, according to the first user equipment reachability notification request message, that the downlink data expires, where the first user equipment reachability notification request message carries the validity period of the downlink data.

With reference to the second possible implementation manner of the fourth aspect or the third possible implementation manner of the fourth aspect, in an eleventh possible implementation manner of the fourth aspect, the core network control entity further includes an establishing unit:

configured to: after a downlink data notification message or downlink data sent by the server that buffers the downlink data is received, establish an evolved universal terrestrial radio access network radio access bearer corresponding to a bearer for transmitting a corresponding data packet or establish a radio access bearer corresponding to a Packet Data Protocol context for transmitting a corresponding data packet; or configured to establish a user plane bearer or a Packet Data Protocol context.

According to a fifth aspect, a user equipment is provided, including:

a sending unit, configured to send a first message to a core network control entity; and a power saving unit, configured to: when receiving a third message that includes third indication information and is sent by the core network control entity according to the first message, disable a receiver or enable the user equipment to enter a power saving mode or shut down, where the third indication information indicates that a server has no downlink data to be sent to the user equipment.

With reference to the fifth aspect, in a first possible implementation manner of the fifth aspect, the user equipment further includes:

a retaining unit, configured to: when receiving a second message that includes second indication information and is sent by the core network control entity according to the first message, retain an established signaling connection, so as to wait to receive downlink data, where the second indication information indicates that the server has downlink data to be sent to the user equipment.

With reference to the fifth aspect or the first possible implementation manner of the fifth aspect, in a second possible implementation manner of the fifth aspect, when the user equipment includes the retaining unit, the user equipment further includes:

a determining unit, configured to: when a current access network is a general packet radio service technology network, determine whether a Packet Data Protocol context is reserved; and an initiating unit, configured to: when no Packet Data Protocol context is reserved, initiate a Packet Data Protocol context process, so as to establish a Packet Data Protocol context.

According to a sixth aspect, a server is provided, including a first sending unit, a first receiving unit, and a second sending unit, where the first sending unit is configured to send a first user equipment reachability notification request message to a home subscriber server or home location register to which a user equipment belongs, so that the home subscriber server or the home location register sends a second user equipment reachability notification request message to a core network control entity to which the user equipment belongs, and therefore the core network control entity sets first indication information according to the second user equipment reachability notification request message, where the first indication information indicates that the server buffers downlink data to be sent to the user equipment; the first receiving unit is configured to receive a second user equipment reachability notification message that is sent by the home subscriber server or the home location register after the home subscriber server or the home location register receives a first user equipment reachability notification message that is sent by the core network control entity according to the first indication information; and the second sending unit is configured to send the downlink data to the user equipment; or the first sending unit is configured to send data buffering indication information to a core network control entity to which a user equipment belongs, so that the core network control entity sets first indication information according to the data buffering indication information, where the data buffering indication information indicates that the server buffers downlink data to be sent to the user equipment and the first indication information indicates that the server buffers the downlink data to be sent to the user equipment; the first receiving unit is configured to receive a downlink data delivery request message that is sent by the core network control entity according to the first indication information; and the second sending unit is configured to send the downlink data to the user equipment.

With reference to the sixth aspect, in a first possible implementation manner of the sixth aspect, the server further includes: a third sending unit, configured to: when determining that the downlink data expires, send a second user equipment reachability notification cancellation message to the home subscriber server or the home location register, so that the home subscriber server or the home location register sends a first user equipment reachability notification cancellation message to the core network control entity, and therefore the core network control entity deletes the first indication information according to the first user equipment reachability notification cancellation message; or the first user equipment reachability notification request message further includes a validity period of the downlink data, so that the home subscriber server sends a first user equipment reachability notification cancellation message to the core network control entity when determining, according to the first user equipment reachability notification request message, that the validity period of the downlink data expires, and therefore the core network control entity deletes the first indication information according to the first user equipment reachability notification cancellation message.

With reference to the sixth aspect, in a second possible implementation manner of the sixth aspect, the server further includes a fourth sending unit, configured to: when determining that a validity period of the downlink data expires, send a fourth message to the core network control entity, where the fourth message is used to instruct the core network control entity to delete the first indication information; or the data buffering indication information further includes a validity period of the downlink data, so that the core network control entity sets the first indication information that is further used to indicate the validity period of the downlink data, and deletes the first indication information when the validity period of the downlink data expires.

Therefore, in the embodiments of the present invention, after the first message sent by the user equipment is received, it is determined whether the first indication information is set, where the first indication information indicates that the server buffers the downlink data to be sent to the user equipment, and the signaling connection to the user equipment is retained only when it is determined that the first indication information is set, which can reduce signaling consumption in a process of sending downlink data, and avoid a process of disconnecting and reestablishing a signaling connection between a user equipment and a network entity, thereby avoiding frequent status changes of the user equipment and the network entity, and saving power of the user equipment.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a method for transmitting data according to an embodiment of the present invention;

FIG. 2 is a schematic flowchart of a method for transmitting data according to another embodiment of the present invention;

FIG. 5 is a schematic flowchart of a method for transmitting data according to another embodiment of the present invention;

DESCRIPTION OF EMBODIMENTS

Figure 3:
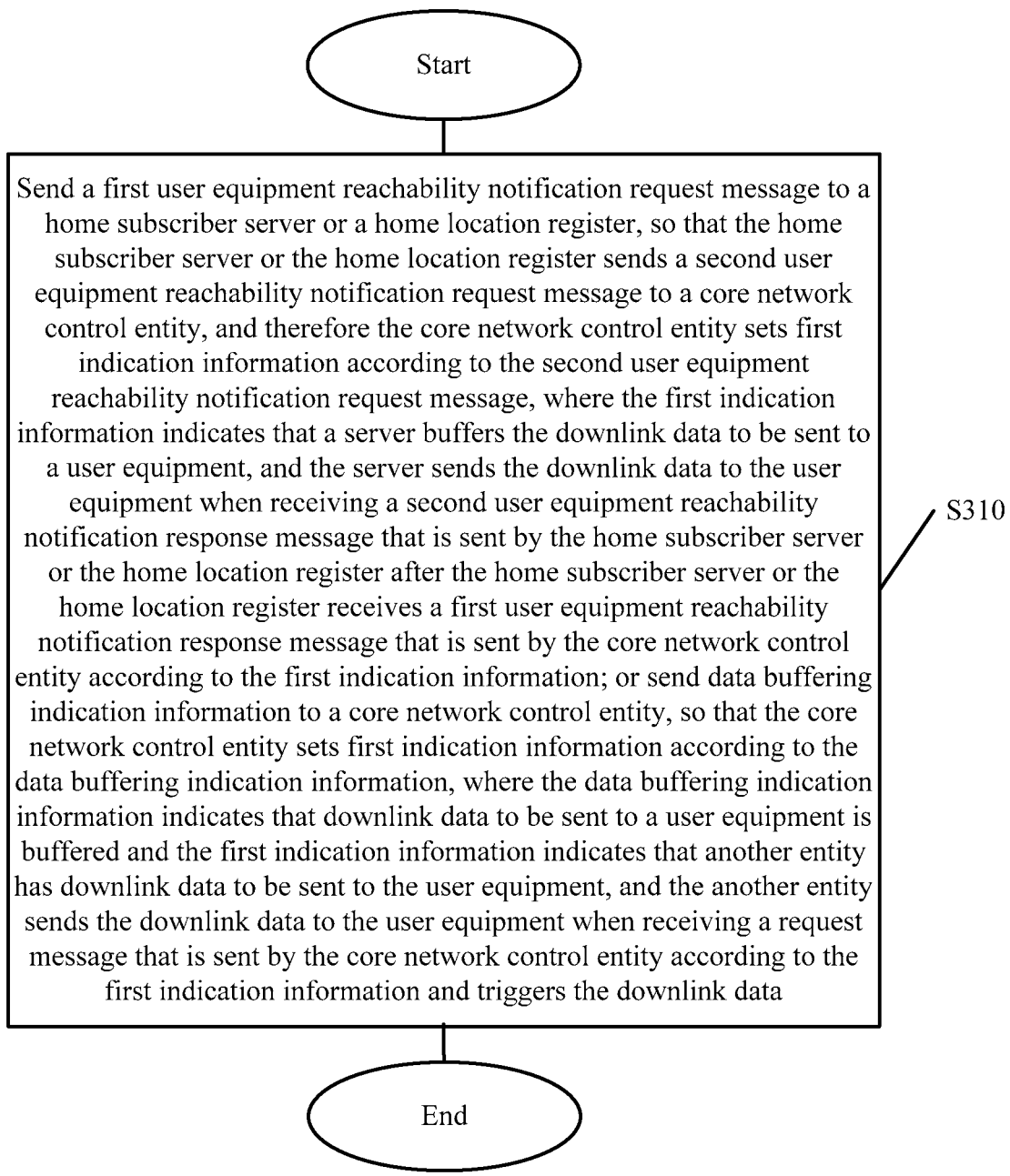
FIG. 3 is a schematic flowchart of a method for transmitting data according to another embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention can be applied to various communications systems, such as: a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short), and a Universal Mobile Telecommunications System (Universal Mobile Telecommunications System, "UMTS" for short).

A user equipment (User Equipment, "UE" for short) may also be referred to as a terminal (Terminal) and may communicate with one or more core networks by using a radio access network (Radio Access Network, "RAN" for short).

When ordinal numbers, such as "first", "second", "third", "fourth", and "fifth", are mentioned in the present invention, it should be understood that they are merely used for distinguishing unless they actually express a sequence according to a context.

FIG. 1 is a schematic flowchart of a method 100 for transmitting data according to an embodiment of the present invention. The method 100 may be executed by a core network control entity, for example, an SGSN or an MME. As shown in FIG. 1, the method 100 includes:

S110: After receiving a first message sent by a user equipment, determine whether first indication information is set, where the first indication information indicates that a server buffers downlink data to be sent to the user equipment.

S120: When determining that the first indication information is set, retain a signaling connection to the user equipment, and trigger the server that buffers the downlink data to send the downlink data to the user equipment.

Specifically, after receiving the first message, for example, a TAU/RAU request message, an attach (attach) request message, or a service request message, sent by the user equipment, the core network control entity, for example, an SGSN or an MME, may check whether the first indication information indicating that the server buffers the downlink data to be sent to the user equipment is set in the core network control entity; after determining that the first indication information is set, the core network control entity may retain the signaling connection to the user equipment and trigger the server that buffers the downlink data to send the downlink data to the user equipment, so that the core network control entity sends the downlink data to the user equipment by using the retained signaling connection to the user equipment after receiving downlink data or a downlink data notification that is to be sent by the server to the user equipment.

In the embodiment of the present invention, the triggering the server that buffers the downlink data to send the downlink data to the user equipment can be implemented in the following two manners.

Manner 1: Directly send a downlink data delivery request to the server that buffers the downlink data, so as to request the server that buffers the downlink data to send the downlink data to the user equipment.

Manner 2: Send a first user equipment reachability notification message to a home subscriber server or home location register to which the user equipment belongs, so that the home subscriber server or the home location register sends a second user equipment reachability notification message to the server according to the first user equipment reachability notification message sent by the core network control entity, the server may determine, by using the second user equipment reachability notification message, that the user equipment is reachable, and therefore the server may send the buffered downlink data to the user equipment.

In the embodiment of the present invention, that a user equipment is reachable means that the user equipment can respond to a paging (paging) message or retain a signaling connection to a core network control entity, for example, a user equipment is reachable in a period of time after the user equipment sends a TAU/RAU request message and sends an uplink data request. In the embodiment of the present invention, that a server sends a user equipment reachability notification request message to a home subscriber server or home location register to which the user equipment belongs means that the server sends the user equipment reachability notification request message to the home subscriber server or the home location register, so as to request receiving of a notification when the user equipment is reachable. After receiving a second user equipment reachability notification that the home subscriber server or the home location register sends after receiving a first user equipment reachability notification sent by the core network control entity, the server may determine that the user equipment is reachable, and therefore the server may send downlink data to the user equipment.

After retaining the signaling connection for a certain period of time, the user equipment may enter an idle mode or a power saving state, or shut down, so as to save power.

Therefore, according to the method for transmitting data in the embodiment of the present invention, after the first message sent by the user equipment is received, it is determined whether the first indication information is set, where the first indication information indicates that the server buffers the downlink data to be sent to the user equipment, and the signaling connection to the user equipment is retained only when it is determined that the first indication information is set, which can reduce signaling consumption in a process of sending downlink data, and avoid a process of disconnecting and reestablishing a signaling connection between a user equipment and a network entity, thereby avoiding frequent status changes of the user equipment and the network entity, and saving power of the user equipment.

In the embodiment of the present invention, the retaining a signaling connection to the user equipment in S120 includes:

sending a second message including second indication information to the user equipment, where the second indication information indicates that there is data to be sent to the user equipment, so as to retain the signaling connection to the user equipment.

Specifically, the core network control entity may send, to the user equipment by using the second message, for example, a TAU/RAU accept message, an attach accept message, a direct transfer (direct transfer) message, a service accept message, or another NAS message such as a downlink NAS transport message (downlink NAS transport message), the second indication information used to indicate that there is data to be sent to the user equipment, so that, after receiving the second message that includes the second indication information and is sent by the core network control entity, the user equipment remains in a communication-capable state, that is, retains the signaling connection to the core network control entity, so as to wait to receive the downlink data sent by the server.

In the embodiment of the present invention, the retaining a signaling connection to the user equipment means that the core network control entity does not initiate a signaling connection release process, and for the user equipment, an established RRC connection is retained and not released, that is, a timer T3440 or T3340 specified in an existing standard is not started; and if the user equipment retains the signaling connection for a predetermined period of time, and receives the second message sent by the core network control entity after the timer T3440 or T3340 is started, the timer T3440 or T3340 may be deleted.

In the embodiment of the present invention, the sending the second message including the second indication information to the user equipment may include:

when duration, preset for the user equipment, in which a signaling connection can be retained is less than a predetermined threshold, sending the second message to the user equipment.

Specifically, when determining that the first indication information is set in the core network control entity, the core network control entity may determine whether the duration, preset for the user equipment, in which a signaling connection can be retained is less than the predetermined threshold, and sends the second message including the second indication information to the user equipment only when the duration is less than the predetermined threshold.

In the embodiment of the present invention, the method 100 may further include:

when determining that the first indication information is not set, sending a third message including third indication information to the user equipment, where the third indication information indicates that there is no downlink data to be sent to the user equipment, so that the user equipment disables a receiver or enters a power saving mode or shuts down according to the third indication information.

Specifically, the core network control entity may generate the third indication information after receiving the first message sent by the user equipment and when determining that the first indication information is not set in the core network control entity, where the third indication information indicates that there is no downlink data to be sent to the user equipment; and then, may send the third indication information to the user equipment by using the third message, for example, a TAU/RAU accept message, an attach accept message, a direct transfer (direct transfer) message, a service accept message, or another NAS message, so that the user equipment may disable the receiver, may enter the power saving mode, or may shut down after receiving the third message that includes the third indication information and is sent by the core network control entity.

Therefore, in the embodiment of the present invention, after it is determined that the first indication information indicating that the server buffers the downlink data to be sent to the user equipment is not set, the third message that includes the third indication information indicating that the server has no downlink data to be sent to the user equipment is sent to the user equipment, so that the user equipment disables the receiver or enters the power saving mode or shuts down after receiving the third message that includes the third indication information and is sent by the server, and therefore power can be saved.

In the embodiment of the present invention, the second indication information may further include address information of a server, so that the user equipment may disable the receiver, enter the power saving mode, or shut down after receiving data sent by a server corresponding to the server address information included in the second indication information, which can further save power.

When multiple servers are to send data to the user equipment, the second indication information may include address information of the multiple servers, so that the user equipment disables the receiver, enters the power saving mode, or shuts down after receiving the data from the multiple servers.

For a time-controlled user equipment, triggering, according to a first message, an SCS (or MTC SERVER) to send downlink data may occur beyond a range of allowed communication time for the time-controlled user equipment, and an evolved packet system (Evolved Packet System, "EPS" for short) network needs to reject or discard data to be sent. In this case, extra load is caused to the network.

Therefore, in the embodiment of the present invention, before the determining, after receiving a first message sent by a user equipment, whether first indication information is stored, the method 100 may further include:

when the user equipment is a time-controlled user equipment, determining whether the current time is within a range of allowed communication time; where the determining whether first indication information is stored includes:

when determining that the current time is within the range of allowed communication time of the user equipment, determining whether the first indication information is set.

Specifically, after receiving the first message sent by the user equipment, the core network control entity may determine whether the user equipment is a time-controlled user equipment according to subscription data of the user equipment. If determining that the user equipment is a time-controlled user equipment, the core network control entity may further determine whether the current time is within the range of allowed communication time of the user equipment according to the subscription data of the user equipment, and determines whether the first indication information is set only when determining that the current time is within the range of allowed communication time of the user equipment.

In the embodiment of the present invention, when the user equipment is not within the range of allowed communication time, the subsequent process of the embodiment of the present invention is not executed. For a subsequent implementation manner, reference may be made to the prior art. For brevity, details are not repeatedly described herein.

Therefore, according to the method for transmitting data in the embodiment of the present invention, only after it is determined that the current time is within the range of allowed communication time of the user equipment, it is determined whether the first indication information is set, which reduces network load.

In the embodiment of the present invention, before the determining whether first indication information is set in S110, the method 100 may further include:

receiving data buffering indication information sent by the server that buffers the downlink data, where the data buffering indication information indicates that the server buffers the downlink data to be sent to the user equipment, and setting the first indication information according to the data buffering indication information.

Specifically, in the embodiment of the present invention, when the server needs to send the downlink data to the user equipment, and current time is beyond a time range for sending downlink data to the user equipment, the server may buffer the downlink data and send, to the core network control entity, the data buffering indication information indicating that the server buffers the downlink data to be sent to the user equipment. After receiving the data buffering indication information sent by the server, the core network control entity may set the first indication information.

Alternatively, in the embodiment of the present invention, before the determining whether first indication information is set in S110, the method 100 may further include:

receiving a second user equipment reachability notification request message that is sent by the home subscriber server or home location register to which the user equipment belongs after the home subscriber server or home location register receives a first user equipment reachability notification request message, and setting the first indication information according to the second user equipment reachability notification request message.

Specifically, when the server needs to send the downlink data to the user equipment, and current time is beyond a time range for sending downlink data to the user equipment, the server may buffer the downlink data and send the first user equipment reachability notification request message to the home subscriber server or home location register to which the user equipment belongs, where the first user equipment reachability notification request message may carry address information of the server and identity information of the user equipment. Then, the home subscriber server or the home location register may send, according to the first user equipment reachability notification request message, the second user equipment reachability notification request message to the core network control entity to which the user equipment belongs, where the second user equipment reachability notification request message may carry the identity information of the user equipment. After receiving the second user equipment reachability notification request message sent by the home subscriber server or the home location register, the core network control entity may set the first indication information.

Alternatively, in the embodiment of the present invention, before the determining whether the first indication information is stored in S110, the method 100 may further include:

receiving a context response message sent by a source core network control entity serving the user equipment; and when the context response message includes the first indication information, setting the first indication information.

Specifically, in a TAU/RAU process of the user equipment, if a core network control entity to which the user equipment is attached changes, the core network control entity may send a context request message to the source core network control entity serving the user equipment to acquire user information, receive the context response message sent by the source core network control entity serving the user equipment, and set the first indication information when determining that the context response message includes the first indication information.

Before the determining, after receiving a first message sent by a user equipment, whether first indication information is set, the method 100 may further include:

when determining, according to the first indication information, that a validity period of the downlink data expires, deleting the first indication information, where the first indication information is further used to indicate the validity period of the downlink data, and the validity period, indicated by the first indication information, of the downlink data is set according to a validity period, of the downlink data, carried in the data buffering indication information sent by the server that buffers the downlink data.

Specifically, if the downlink data that is buffered in the server and is to be sent to the user equipment has a validity period, the data buffering indication information sent by the server to the user equipment further indicates the validity period of the downlink data that is buffered in the server and is to be sent to the user equipment. After receiving the data buffering indication information sent by the server, the core network control entity may set the first indication information that is further used to indicate the validity period of the downlink data. If the validity period expires but corresponding data is not sent yet, the core network control entity may delete the first indication information.

Alternatively, in the embodiment of the present invention, before the determining, after receiving a first message sent by a user equipment, whether first indication information is set, the method 100 may further include:

receiving a fourth message that is sent, after a validity period of the downlink data expires, by the server that buffers the downlink data, where the fourth message is used as an instruction to delete the first indication information, and deleting the first indication information according to the fourth message.

Specifically, if the downlink data that is buffered in the server and is to be sent to the user equipment has a validity period, and if the validity period expires but corresponding data is not sent yet, the server may instruct the core network control entity to delete the first indication information that is stored, so that the core network control entity may delete the first indication information according to the instruction of the server.

Alternatively, in the embodiment of the present invention, before the determining, after receiving a first message sent by a user equipment, whether first indication information is set, the method 100 may further include:

receiving a first user equipment reachability notification cancellation message sent by the home subscriber server or home location register to which the user equipment belongs, and deleting the first indication information according to the first user equipment reachability notification cancellation message.

In the embodiment of the present invention, the receiving a first user equipment reachability notification cancellation message sent by the home subscriber server or the home location register may include:

receiving the first user equipment reachability notification cancellation message that is sent by the home subscriber server or the home location register according to a second user equipment reachability notification cancellation message sent by the server that buffers the downlink data of the user equipment; or includes:

receiving the first user equipment reachability notification cancellation message that is sent by the home subscriber server or the home location register after the home subscriber server or the home location register determines, according to the first user equipment reachability notification request message, that the downlink data expires, where the first user equipment reachability notification request message carries the validity period of the downlink data.

It should be understood that, in the embodiment of the present invention, the first indication information may be used to indicate that multiple servers have downlink data to be sent to the user equipment. After receiving a user equipment reachability notification cancellation message sent by any server or determining that data to be sent by any server to the user equipment expires, the home subscriber server or the home location register may delete user equipment reachability-related information of the any server. After deleting all user equipment reachability-related information of the multiple servers, that is, there is no notification request for user equipment reachability, the home subscriber server or the home location register instructs the core network control entity to delete the first indication information.

In the prior art, only by using a TAU/RAU request message, a server can be triggered to send buffered downlink data to a user equipment. For a low-mobility device, few or even no TAU/RAU process is performed. In this case, sending data by the server to the user equipment is possibly affected because to-be-sent data buffered in the server may become invalid or be deleted after a certain period of time. However, in the embodiment of the present invention, the first message may be a TAU/RAU request message, may be an attach request message, or may be a service request message. Therefore, chances for the server to send buffered downlink data to the user equipment can be increased, which prevents data from becoming invalid or being deleted.

In the embodiment of the present invention, the method 100 may further include:

after receiving a downlink data notification message or downlink data sent by the server that buffers the downlink data, establishing an evolved universal terrestrial radio access network radio access bearer (Evolved Universal Terrestrial Radio Access Network Radio Access Bearer, "E-RAB" for short) corresponding to a bearer for transmitting a corresponding data packet or establishing a radio access bearer (Radio Access Bearer, "RAB" for short) corresponding to a Packet Data Protocol (Packet Data Protocol, "PDP" for short) context for transmitting a corresponding data packet.

Specifically, when determining that the first indication information is set, the core network control entity retains the signaling connection to the user equipment, where the signaling connection to the user equipment may be retained by sending the second message including the second indication information to the user equipment; and the retaining the signaling connection to the user equipment means that the core network control entity does not initiate a signaling connection release process, and for the user equipment, an established RRC connection is retained and not released, that is, a timer T3440 or T3340 specified in an existing standard is not started; and if the user equipment retains the signaling connection for a predetermined period of time, and receives the second message sent by the core network control entity after the timer T3440 or T3340 is started, the timer T3440 or T3340 may be deleted. After receiving a request that is sent by the core network control entity and is used to instruct the server to send the downlink data to the user equipment, or the second user equipment reachability notification message that is sent by the home subscriber server or the home location register after the home subscriber server or the home location register receives the first user equipment reachability notification message sent by the core network control entity, the server starts to send the downlink data. For a System Architecture Evolution (System Architecture Evolution, "SAE" for short) network, after a core network control entity receives a downlink data notification message, or for a general packet radio service (General Packet Radio Service, "GPRS" for short) network, after an SGSN receives downlink data, the core network control entity may directly require a radio access network (Radio Access Network, "RAN" for short) side (for example, an eNodeB or a radio network controller (Radio Network Controller, "RNC" for short)) to establish an evolved universal terrestrial radio access network radio access bearer (E-RAB) corresponding to a bearer for transmitting a corresponding data packet or establish a radio access bearer (Radio Access Bearer, "RAB" for short) corresponding to a Packet Data Protocol PDP context for transmitting a corresponding data packet. For example, for the SAE network, an MME sends an initial context setup (initial context setup) message to an eNodeB according to an EPS bearer (bearer) identifier (Identifier, "ID" for short) in a received downlink data notification (downlink data notification), so as to establish a corresponding E-RAB (radio bearer (radio bearer) and S1 bearer (S1 bearer)); for the GPRS network, an SGSN sends a radio access bearer assignment (radio access bearer assignment) message to an RNC, so as to establish a corresponding RAB (a user plane between the user equipment, the RNC, and the SGSN).

Alternatively, in the embodiment of the present invention, the method 100 may further include:

establishing a user plane or a PDP context.

Specifically, when determining that the first indication information is set, the core network control entity may retain the signaling connection to the user equipment, where the signaling connection to the user equipment may be retained by sending the second message including the second indication information to the user equipment, and the retaining the signaling connection to the user equipment means that the core network control entity does not initiate a signaling connection release process, and for the user equipment, an established RRC connection is retained and not released, that is, a timer T3440 or T3340 specified in an existing standard is not started; and if the user equipment retains the signaling connection for a predetermined period of time, and receives the second message sent by the core network control entity after the timer T3440 or T3340 is started, the timer T3440 or T3340 may be deleted. The core network control entity may execute a process of establishing E-RABs of all bearers or RABs of all PDP contexts at the same time when sending the second message including the second indication information to the user equipment, or may execute a process of establishing E-RABs of all bearers or RABs of all PDP contexts when determining that the first indication information is set. For an SAE network, it refers to establishing of radio bearers that are between the user equipment and an eNodeB and are corresponding to all activated bearers of the user equipment, and establishing of an S1 user plane connection between the eNodeB and a serving gateway (Serving Gateway, "SGW" for short); and for a UMTS network, it refers to establishing of radio bearers that are between the user equipment and an RNC and are corresponding to all activated PDP contexts of the user, and establishing of an Iu user plane connection between the RNC and an SGSN. For a bearer for which no E-RAB/RAB is successfully established, the user equipment and the network release the bearer or the PDP context.

Alternatively, in the embodiment of the present invention, the triggering the server that buffers the downlink data to send the downlink data to the user equipment may include:

when a network that the user equipment currently accesses is a GPRS network and it is determined that a PDP context has been established for the user equipment, triggering the server to send the buffered downlink data to be sent to the user equipment.

Specifically, for a GPRS network, if no PDP context is reserved, after receiving the second message (a TAU/RAU response message or an attach accept message) that includes the second indication information and is sent by the core network control entity, the user equipment initiates a process of activating a PDP context, so as to establish a PDP context. After it is determined that the PDP context has been established for the user equipment, that is, after an SGSN receives an active PDP context accept (active PDP context accept) message sent by the user equipment, the core network control entity triggers the server to send the downlink data, where a parameter used by the user equipment to initiate the process of activating the PDP context may be preconfigured on the user equipment.

Therefore, according to the method for transmitting data in the embodiment of the present invention, after the first message sent by the user equipment is received, it is determined whether first indication information is set, where the first indication information indicates that the server buffers the downlink data to be sent to the user equipment. When it is determined that the first indication information is set, the signaling connection to the user equipment is retained. After it is determined that the first indication information indicating that the server buffers the downlink data to be sent to the user equipment is not stored, the third message that includes the third indication information indicating that the server has no downlink data to be sent to the user equipment is sent to the user equipment, so that the user equipment disables the receiver or enters the power saving mode or shuts down after receiving the third message that includes the third indication information and is sent by the server, and therefore power can be saved, and power of the user equipment can be saved. Further, when determining that the server has the downlink data to be sent to the user equipment, the core network control entity establishes a bearer required for sending the downlink data, thereby saving time required for transmitting the downlink data. Further, in the embodiment of the present invention, only after it is determined that the current time is within the range of allowed communication time of the user equipment, it is determined whether the first indication information is set, which reduces network load. Further, in the embodiment of the present invention, the first message may be a TAU/RAU request message, an attach request message, or a service request message, so that chances for the server to send buffered downlink data to the user equipment can be increased, which prevents data from becoming invalid or being deleted.

The foregoing already describes the method 100 for transmitting data of the embodiments of the present invention from a core network control entity side with reference to FIG. 1. The following describes a method for transmitting data of the embodiments of the present invention from a user equipment side with reference to FIG. 2.

FIG. 2 is a schematic flowchart of a method 200 for transmitting data according to an embodiment of the present invention. The method may be executed by a user equipment. As shown in FIG. 2, the method 200 includes:

S210: Send a first message to a core network control entity.

S220: When receiving a third message that includes third indication information and is sent by the core network control entity according to the first message, disable a receiver or enable the user equipment to enter a power saving mode or shut down, where the third indication information indicates that a server has no downlink data to be sent to the user equipment.

Therefore, in the embodiment of the present invention, the user equipment sends the first message to the core network control entity, and after receiving the third message that includes the third indication information and is sent by the core network control entity according to the first message, disables the receiver or enters the power saving mode or shuts down, where the third indication information indicates that there is no downlink data to be sent to the user equipment, so that power of the user equipment can be saved.

In the embodiment of the present invention, the method 200 may further include:

when receiving a second message that includes second indication information and is sent by the core network control entity according to the first message, retaining an established signaling connection, so as to wait to receive downlink data, where the second indication information indicates that there is downlink data to be sent to the user equipment.

Specifically, after receiving the second message that includes the second indication information and is sent by the core network control entity (for example, an MME or an SGSN), the user equipment does not start a timer T3440 or T3340 specified in a standard, keeps an RRC connection unreleased, and waits for the downlink data sent by the server.

Therefore, in the embodiment of the present invention, the user equipment keeps the RRC connection unreleased. This saves a paging (paging) process and a process of reestablishing an RRC connection by the user equipment, and can further save power.

In the embodiment of the present invention, when the second message that includes the second indication information and is sent by the core network control entity according to the first message is received, the method 200 may further include:

when a current access network is a general packet radio service technology network, determining whether a Packet Data Protocol context is reserved; and when no Packet Data Protocol context is reserved, initiating a Packet Data Protocol context process, so as to establish a Packet Data Protocol context.

In the embodiment of the present invention, the first message may be a tracking area update/routing area update (TAU/RAU) request message, and the second message may be a TAU/RAU accept message; or the first message may be an attach request message, and the second message may be an attach response message; or the first message may be a service request message, and the second message may be a direct transfer message or a service accept message.

Therefore, in the embodiment of the present invention, the user equipment sends the first message to the core network control entity; after receiving the third message that includes the third indication information and is sent by the core network control entity according to the first message, disables the receiver or enters the power saving mode or shuts down, where the third indication information indicates that there is no downlink data to be sent to the user equipment; and after receiving the second message that includes the second indication information and is sent by the core network control entity according to the first message, retains the established signaling connection, so as to wait to receive the downlink data, where the second indication information indicates that there is downlink data to be sent to the user equipment, so that power of the user equipment can be saved.

FIG. 3 is a schematic flowchart of a method 300 for transmitting data according to an embodiment of the present invention. The method 300 is executed by a server, for example, an SCS or an MTC SERVER. As shown in FIG. 3, the method 300 may include:

S310: Send a first user equipment reachability notification request message to a home subscriber server or home location register to which a user equipment belongs, so that the home subscriber server or the home location register sends a second user equipment reachability notification request message to a core network control entity to which the user equipment belongs, and therefore the core network control entity sets first indication information according to the second user equipment reachability notification request message, where the first indication information indicates that the server buffers downlink data to be sent to the user equipment, and the server sends the downlink data to the user equipment when receiving a second user equipment reachability notification message that is sent by the home subscriber server or the home location register after the home subscriber server or the home location register receives a first user equipment reachability notification message that is sent by the core network control entity according to the first indication information; or send data buffering indication information to a core network control entity to which a user equipment belongs, so that the core network control entity sets first indication information according to the data buffering indication information, where the data buffering indication information indicates that the server buffers downlink data to be sent to the user equipment and the first indication information indicates that the server buffers the downlink data to be sent to the user equipment, and the server sends the downlink data to the user equipment when receiving a downlink data delivery request message that is sent by the core network control entity according to the first indication information.

Specifically, in the embodiment of the present invention, when determining that there is downlink data to be sent to the user equipment, if current time is beyond a time range for sending downlink data to the user equipment, the server may buffer corresponding downlink data. Then, the server may send the data buffering indication information to the core network control entity, so that the core network control entity may set the first indication information according to the data buffering indication information, and after receiving the first message sent by the user equipment, may retain, according to the first indication information, a signaling connection to the user equipment and request the server to send the downlink data to the user equipment. Therefore, the core network control entity may use the retained signaling connection to send, to the user equipment, the downlink data that is to be sent to the user equipment and is sent by the server.

Alternatively, in the embodiment of the present invention, when determining that there is downlink data to be sent to the user equipment, if current time is beyond a time range for sending downlink data to the user equipment, the server may buffer corresponding downlink data. Then, the server may send the first user equipment reachability notification request message to the home subscriber server or home location register to which the user equipment belongs, where the first user equipment reachability notification request message may carry identity information of the user equipment or address information of the server. The home subscriber server or home location register to which the user equipment belongs sends the second user equipment reachability notification request message to the core network control entity, where the second user equipment reachability notification request message may carry the identity information of the user equipment. After receiving the second user equipment reachability notification request message sent by the home subscriber server or home location register to which the user equipment belongs, the core network control entity may set the first indication information indicating that the server buffers the downlink data to be sent to the user equipment, and after receiving the first message sent by the user equipment, may retain, according to the first indication information, a signaling connection to the user equipment and request the server to send the downlink data to the user equipment. Therefore, the core network control entity may use the retained signaling connection to send, to the user equipment, the downlink data that is to be sent to the user equipment and is sent by the server.

Therefore, in the embodiment of the present invention, the server sends the first user equipment reachability notification request message to the home subscriber server or the home location register, so that the home subscriber server or the home location register sends the second user equipment reachability notification request message to the core network control entity, and therefore the core network control entity sets the first indication information according to the second user equipment reachability notification request message, where the first indication information indicates that the server buffers the downlink data to be sent to the user equipment, and the server sends the downlink data to the user equipment when receiving a second user equipment reachability notification response message that is sent by the home subscriber server or the home location register after the home subscriber server or the home location register receives a first user equipment reachability notification response message that is sent by the core network control entity according to the first indication information; or sends the data buffering indication information to the core network control entity, so that the core network control entity sets the first indication information according to the data buffering indication information, where the data buffering indication information indicates that the server buffers the downlink data to be sent to the user equipment and the first indication information indicates that the server buffers the downlink data to be sent to the user equipment, and the server sends the downlink data to the user equipment when receiving a request message that is sent by the core network control entity according to the first indication information and triggers the downlink data, which can save power of the user equipment.

In the embodiment of the present invention, when the method 300 includes the sending a first user equipment reachability notification request message to a home subscriber server or home location register, the method 300 may further include:

when determining that the downlink data expires, sending a second user equipment reachability notification cancellation message to the home subscriber server or the home location register, so that the home subscriber server or the home location register sends a first user equipment reachability notification cancellation message to the core network control entity, and therefore the core network control entity deletes the first indication information according to the first user equipment reachability notification cancellation message; or the first user equipment reachability notification request message may further include a validity period of the downlink data, so that the home subscriber server or the home location register sends a first user equipment reachability notification cancellation message to the user equipment when determining, according to the first user equipment reachability notification request message, that the validity period of the downlink data expires, and therefore the core network control entity deletes the first indication information according to the first user equipment reachability notification cancellation message.

In the embodiment of the present invention, when the method 300 may include the sending data buffering indication information to a core network control entity, the method further includes: when determining that a validity period of the downlink data expires, sending a fourth message to the core network control entity, where the fourth message is used to instruct the core network control entity to delete the first indication information; or the data buffering indication information may further include a validity period of the downlink data, so that the core network control entity sets the first indication information that is further used to indicate the validity period of the downlink data, and deletes the first indication information when the validity period of the downlink data expires.

Therefore, in the embodiment of the present invention, the server sends the first user equipment reachability notification request message to the home subscriber server or the home location register, so that the home subscriber server or the home location register sends the second user equipment reachability notification request message to the core network control entity, and therefore the core network control entity sets the first indication information according to the second user equipment reachability notification request message, where the first indication information indicates that the server buffers the downlink data to be sent to the user equipment, and the server sends the downlink data to the user equipment when receiving a second user equipment reachability notification response message that is sent by the home subscriber server or the home location register after the home subscriber server or the home location register receives a first user equipment reachability notification response message that is sent by the core network control entity according to the first indication information; or sends the data buffering indication information to the core network control entity, so that the core network control entity sets the first indication information according to the data buffering indication information, where the data buffering indication information indicates that the downlink data to be sent to the user equipment is buffered and the first indication information indicates that another entity has downlink data to be sent to the user equipment, and the another entity sends the downlink data to the user equipment when receiving a request message that is sent by the core network control entity according to the first indication information and triggers the downlink data, which can save power of the user equipment.

Figure 4:
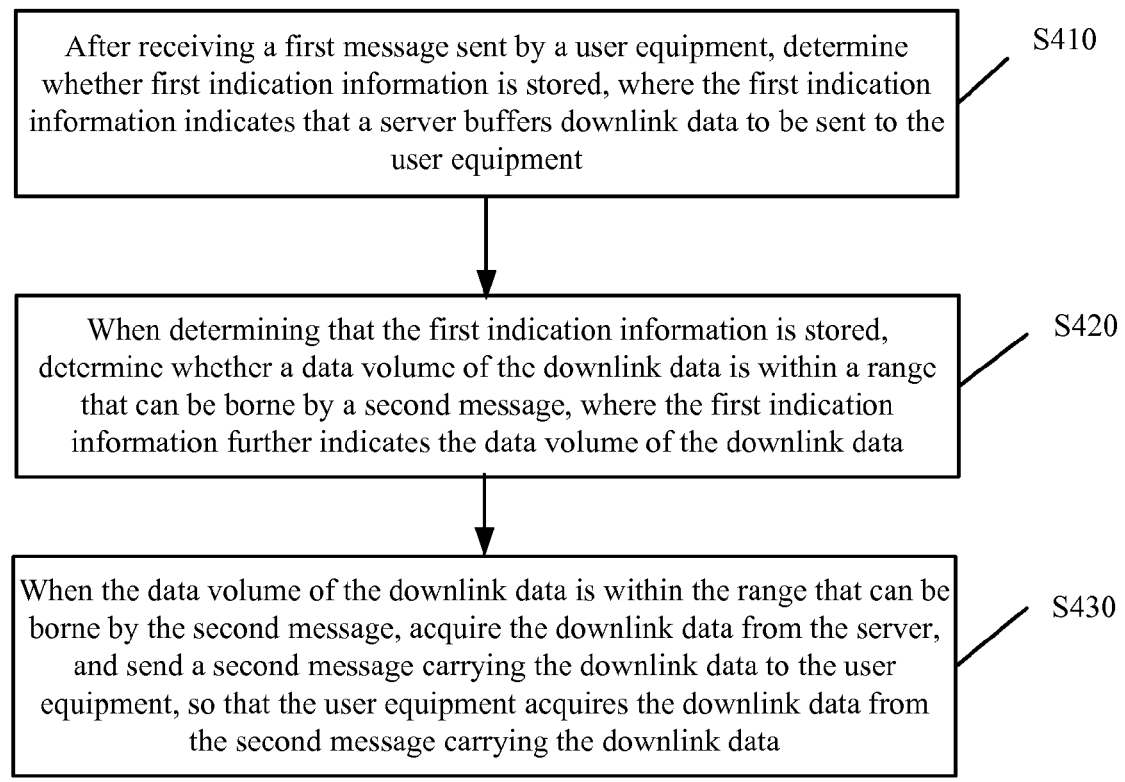
FIG. 4 is a schematic flowchart of a method for transmitting data according to another embodiment of the present invention.

FIG. 4 is a schematic flowchart of a method 400 for transmitting data according to an embodiment of the present invention. As shown in FIG. 4, the method 400 may include:

S410: After receiving a first message sent by a user equipment, determine whether first indication information is stored, where the first indication information indicates that a server buffers downlink data to be sent to the user equipment.

S420: When determining that the first indication information is stored, determine whether a data volume of the downlink data is within a bearing range of a second message, where the first indication information further indicates the data volume of the downlink data.

S430: When the data volume of the downlink data is within the bearing range of the second message, acquire the downlink data from the server, and send a second message carrying the downlink data to the user equipment, so that the user equipment acquires the downlink data from the second message carrying the downlink data.

Specifically, after receiving the first message, for example, a TAU/RAU request message, an attach (attach) request message, or a service request message, sent by the user equipment, the core network control entity (for example, an SGSN or an MME) may check whether the first indication information indicating that the server buffers the downlink data to be sent to the user equipment is stored in the core network control entity; when determining that the first indication information is stored and that the first indication information further indicates the data volume of the downlink data, the core network control entity may determine whether the data volume of the downlink data that is buffered in the server and is to be sent to the current time is within a data bearing range of the second message; and when the data volume of the downlink data that is buffered in the server and is to be sent to the current time is within the range of the data bearing range of the second message, the core network control entity may acquire, from the server, the downlink data that is buffered in the server and is to be sent to the user equipment, and then sends the second message carrying the downlink data to the user equipment, so that the user equipment may acquire the downlink data from the second message after receiving the second message that carries the downlink data and is sent by the core network control entity.

In the embodiment of the present invention, the method 400 may further include:

when the data volume of the downlink data is not within the bearing range of the second message, sending a second message including the first indication information or second indication information to the user equipment, and sending a third message to the server, where the second indication information indicates that there is downlink data to be sent to the user equipment, and the third message is used to instruct the server to send the downlink data to the user equipment, so that the user equipment remains in a communication-capable state according to the first indication information or the second indication information, so as to wait to receive the downlink data sent by the server.

Therefore, in the embodiment of the present invention, the core network control entity may use non-access stratum (Non-Access Stratum, "NAS" for short) signaling, for example, a TAU/RAU response message or an attach accept message, to directly send, to the user equipment, the downlink data that is buffered in the server and is to be sent to the user equipment, which can reduce waiting time of the user equipment, a paging (paging) process for sending data, and a user plane establishing process, and can achieve a power saving effect and save network resources.

FIG. 5 is a schematic flowchart of another method 500 for transmitting data according to an embodiment of the present invention. The method 500 is executed by a server, for example, an SCS or an MTC SERVER. The method 500 may include:

S510: Send first indication information to a core network control entity, where the first indication information indicates that the server buffers downlink data to be sent to a user equipment and indicates a data volume of the downlink data, so that the core network control entity stores the first indication information.

S520: When receiving a request for acquiring the downlink data, where the request is sent by the core network control entity after the core network control entity receives a first message sent by the user equipment and when the core network control entity determines, according to the first indication information, that the data volume of the downlink data is within a bearing range of a second message, send the second message carrying the downlink data to the core network control entity, so that the core network control entity sends the second message carrying the downlink data to the user equipment.

In the embodiment of the present invention, the method 500 may further include:

when the third message is received, sending the downlink data to the user equipment, where the third message is sent by the core network control entity after the core network control entity receives a first message sent by the user equipment and when the core network control entity determines, according to the first indication information, that the data volume of the downlink data is beyond a bearing range of a second message, and the third message is used to request the server to send the downlink data to the user equipment.

In the embodiment of the present invention, the method 500 may include:

when determining that a validity period of the downlink data expires, sending a fifth message to the core network control entity, where the fifth message is used to instruct the core network control entity to delete the first indication information.

Alternatively, in the embodiment of the present invention, the first indication information is further used to indicate a validity period of the downlink data, so that the core network control entity deletes the first indication information when determining, according to the first indication information, that the validity period of the downlink data expires.

Therefore, according to the method in the embodiment of the present invention, the first indication information is sent to the core network control entity. The first indication information indicates that the server buffers the downlink data to be sent to the user equipment and indicates the data volume of the downlink data, so that the core network control entity stores the first indication information that is used to determine whether the data volume of the downlink data is within the bearing range of the second message after the core network control entity receives the first message sent by the user equipment. When the downlink data volume is within the bearing range of the second message, the request for acquiring the downlink data is sent to the server. After receiving the request that is for acquiring the downlink data and sent by the core network control entity, the server sends the downlink data to the core network control entity according to the request for the downlink data, so that the core network control entity may use non-access stratum (Non-Access Stratum, "NAS" for short) signaling, for example, a TAU/RAU response message or an attach accept message, to directly send, to the user equipment, the downlink data that is buffered in the server and is to be sent to the user equipment, which can reduce waiting time of the user equipment, a paging (paging) process for sending data, and a user plane establishing process, and can achieve a power saving effect and save network resources.

The embodiment of the present invention further provides another method for transmitting data, where the method may include:

after receiving uplink data sent by a user equipment, determining whether downlink data to be sent to the user equipment is buffered; and when it is determined that the downlink data to be sent to the user equipment is buffered, sending the downlink data to the user equipment.

Specifically, when the user equipment initiates a service request to the server, the uplink data may be sent to the server by using a service request process to activate a PDP context or bearer; after receiving the uplink data sent by the user equipment, the server determines whether the downlink data to be sent to the user equipment is buffered, then the server may send, to the user equipment, the downlink data that is buffered and is to be sent to the user equipment, where the server may send the downlink data buffered for the user equipment to the user equipment by using an established PDP context or bearer.

Therefore, in the method for transmitting data according to the embodiment of the present invention, a probability of transmitting buffered data by the server is increased, in addition to that an effect of saving power of the user equipment can be achieved.

The foregoing already describes, with reference to FIG. 1 to FIG. 5, the methods for transmitting data according to the embodiments of the present invention separately from a core network control entity side, a user equipment side, and a server side. The following describes, with reference to FIG. 6A to FIG. 9B in an interworking manner, methods for transmitting data according to the embodiments of the present invention. However, it should be understood that, the following embodiments are merely intended to describe the present invention more clearly, and should not constitute any limitations on the present invention.

Figure 6A:
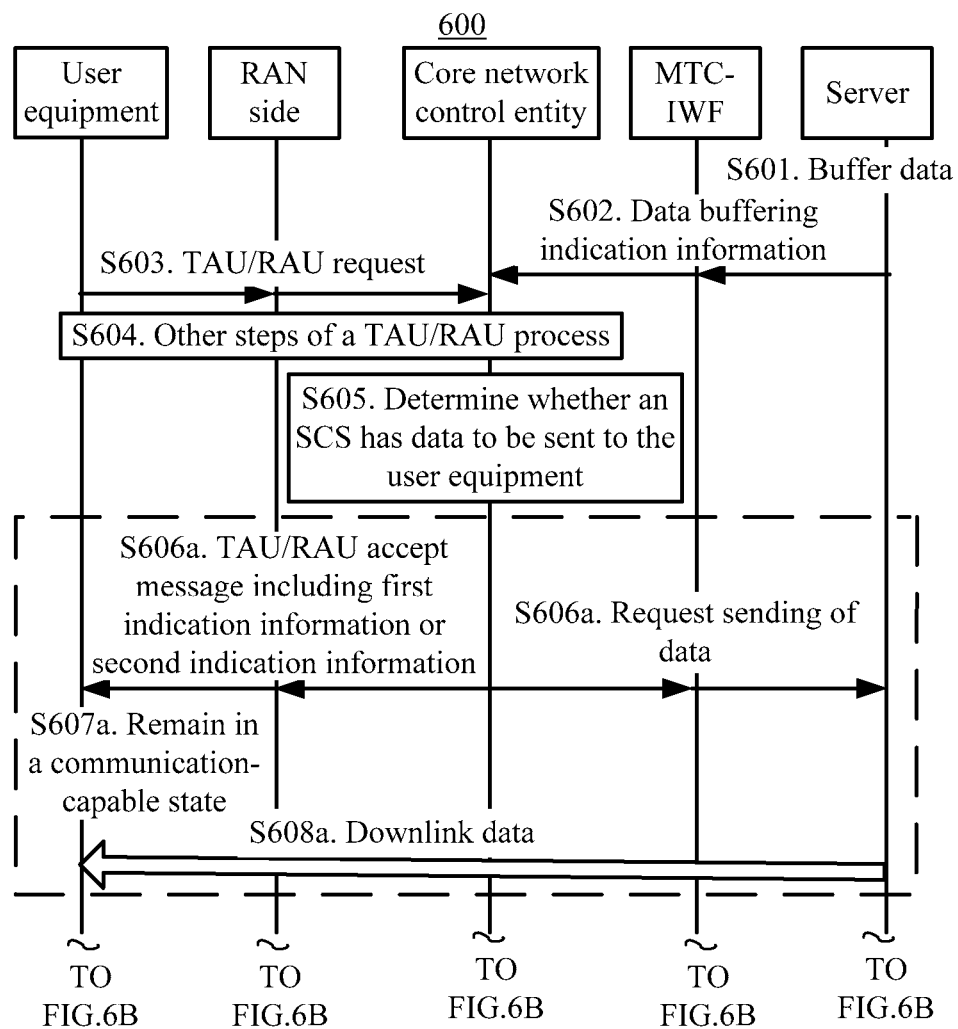
FIGS. 6A and 6B are a schematic flowchart of a method for transmitting data according to another embodiment of the present invention.
Figure 6B:
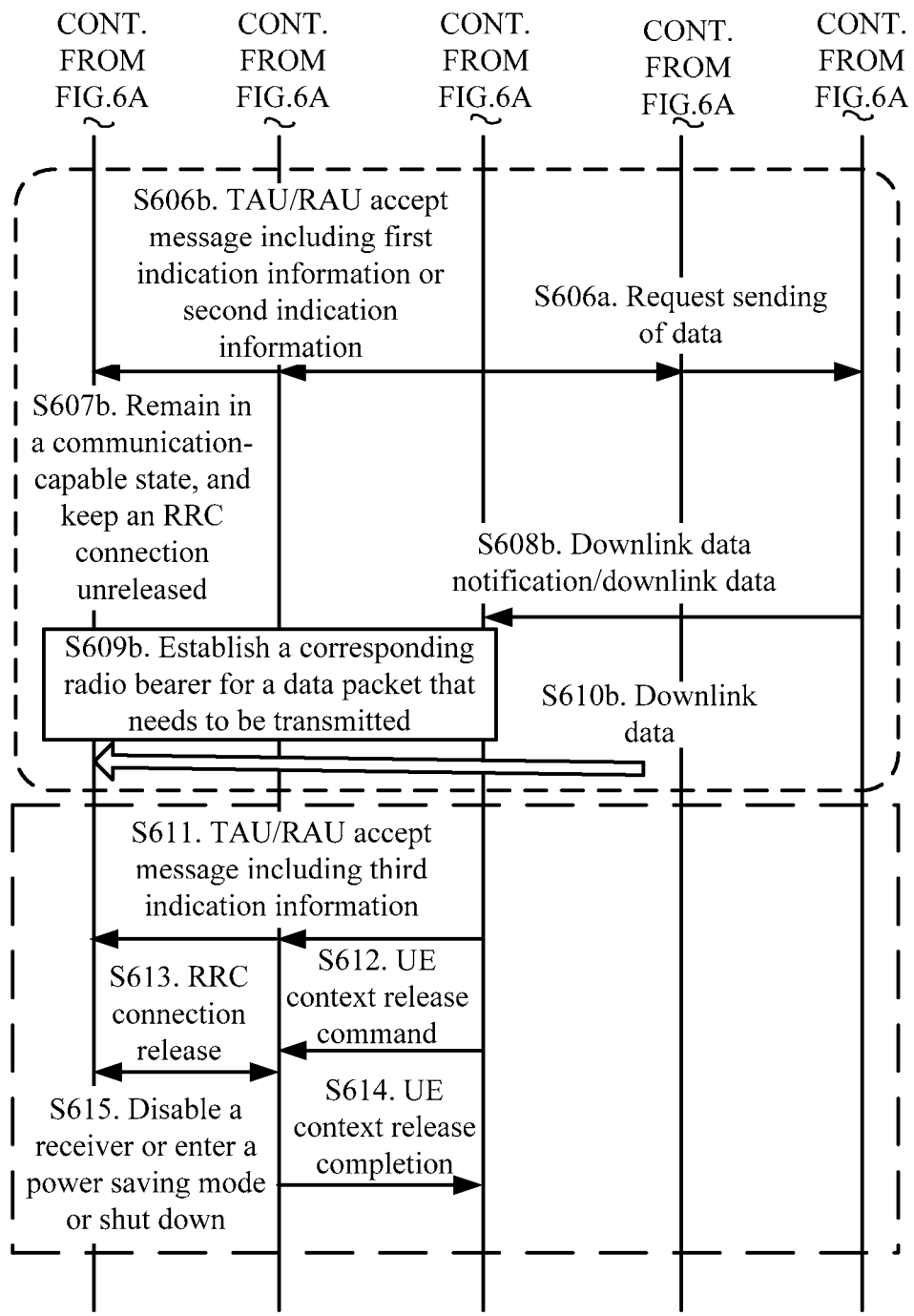

FIG. 6A and FIG. 6B are a schematic flowchart of a method 600 for transmitting data according to an embodiment of the present invention. As shown in FIG. 6A and FIG. 6B, the method 600 includes:

S601: A server (for example, an SCS or an MTC SERVER) has downlink data to be sent to a user equipment, and the server buffers corresponding downlink data because current time is beyond a range of time in which the server is allowed to send data to the user equipment.

S602: The server sends data buffering indication information to a core network control entity (for example, an MME or an SGSN) to which the user equipment is currently attached, where the data buffering indication information indicates that the server buffers the downlink data to be sent to the user equipment. The data buffering indication information may be sent to the core network control entity (an SGSN or an MME) by using a Machine Type Communication Interworking Function (Machine Type Communication-Interworking Function, "MTC-IWF" for short) entity. The MTC-IWF determines, by querying a home subscriber server (Home Subscriber Server, "HSS" for short), the core network control entity to which the user equipment is currently attached. After receiving the data buffering indication information sent by the server, the core network control entity may set first indication information that is used to indicate that the server has the downlink data to be sent to the user equipment.

S603: The user equipment initiates a TAU/RAU process, and the user equipment sends a TAU/RAU request to the core network control entity.

S604: Execute other normal procedures of the TAU/RAU process, for which reference may be specifically made to the prior art, and details are not repeatedly described herein.

S605: Before sending a TAU/RAU accept (accept) message to the user equipment, the core network control entity determines whether the first indication information indicating that the server buffers the downlink data to be sent to the user equipment is set. When it is determined that the first indication information is set, S606a to S608a or S606b to S609b may be executed; and when it is determined that the first indication information is not set, S611 to S615 may be executed. Optionally, when the user equipment is a time-controlled device, before determining whether the first indication information is set, the core network control entity may further check, according to subscription data of the user equipment, whether current time is allowed communication time for the user equipment; and only when the current time belongs to a range of allowed communication time, determines whether the first indication information is set; otherwise, a subsequent process is not executed, and a normal procedure of the TAU/RAU process is executed.

S606a: When determining that the first indication information is set, the core network control entity may forward the first indication information to the user equipment by using the TAU/RAU accept message, or may generate second indication information indicating that there is downlink data to be sent to the user equipment and send the second indication information to the user equipment by using the TAU/RAU accept message, where an identity of the server may be included in the TAU/RAU accept message. In addition, the core network control entity instructs the server to send the downlink data buffered for the user equipment to the user equipment.

S607a: After receiving the TAU/RAU accept message carrying the first indication information or the second indication information, the user equipment remains in a communication-capable state, so as to wait for the server to send the downlink data.

S608a: The server sends the downlink data according to a normal procedure, for which reference may be specifically made to the prior art, and details are not repeatedly described herein.

S606a to S608a are an implementation manner of a subsequent procedure of the method for transmitting data according to the embodiment of the present invention in a case in which the core network control entity determines that the first indication information is set in the core network control entity, and S606b to S610b are another implementation manner.

S606b: When determining that the first indication information is set, the core network control entity may forward the first indication information to the user equipment by using the TAU/RAU accept message, or may generate second indication information indicating that there is downlink data to be sent to the user equipment and send the second indication information to the user equipment by using the TAU/RAU accept message, where an identity of the server may be included in the TAU/RAU accept message. In addition, the core network control entity instructs the server to send, to the user equipment, the downlink data that is buffered and is to be sent to the user equipment.

S607b: After receiving the TAU/RAU accept message carrying the first indication information or the second indication information, the user equipment remains in a communication state, and keeps an established RRC connection unreleased, that is, may not start a timer T3440 or T3340 specified in an existing standard.

S608b: The core network control entity receives a downlink data notification or the downlink data sent by the server.

S609b: After receiving the downlink data notification or downlink data sent by the server, the core network control entity establishes a corresponding radio bearer for a data packet that needs to be transmitted. Specifically, the core network control entity may directly require an RAN side network element (an eNodeB or an RNC) to establish an E-RAB corresponding to a bearer for transmitting a corresponding data packet or establish an RAB corresponding to a PDP context for transmitting a corresponding data packet. For example, for an SAE network, an MME sends an initial context setup (initial context setup) message to an eNodeB according to an EPS bearer ID in the received downlink data notification (downlink data notification), so as to establish a corresponding E-RAB (radio bearer and S1 bearer); for another example, for a GPRS network, an SGSN sends a radio access bearer assignment (radio access bearer assignment) message to an RNC, so as to establish a corresponding RAB (a user plane between the user equipment, the RNC, and the SGSN). The execution process does not affect other bearer or PDP context information on the user equipment and the network side.

S610b: The downlink data may be sent to the user equipment by a core network by using the established bearer.

The following describes, with reference to S611 to S615, a subsequent execution procedure of the method for transmitting data according to the embodiment of the present invention in a case in which the core network control entity determines that the first indication information is not set in the core network control entity.

S611: After determining that the first indication information is not set, the core network control entity generates third indication information and sends the third indication information to the user equipment by using a TAU/RAU accept message, where the third indication information indicates that there is no data to be sent to the user equipment.

S612: The core network control entity sends a user equipment context release command to an RAN side network element.

S613: The RAN side network element releases the RRC connection to the user equipment.

S614: The RAN side network element sends a user equipment context release complete message.

S615: The user equipment disables a receiver or enters a power saving mode or shuts down, so as to save power.

In the embodiment of the present invention, if the data buffered in the server has a validity period and if the data expires but the core network control entity still stores the first indication information, the following two manners may be used for processing:

The server may send a message to the core network control entity to instruct the core network control entity to delete the first indication information that is stored in the core network control entity and indicates that the server buffers the downlink data to be sent to the user equipment. Similarly, the instruction message is initiated by the server and is sent, by using the MTC-IWF, to the core network control entity to which the user equipment is currently attached. Then, the core network control entity may delete the first indication information according to the instruction of the server.

Alternatively, the server sends the validity period of the downlink data to be sent to the user equipment to the core network control entity along with the first indication information. When the validity period expires but corresponding data is not sent yet, the core network control entity deletes the stored first indication information.

It should be also understood that, in the embodiment of the present invention, in a case in which the core network control entity determines, in S605, that the first indication information is set in the core network control entity, a subsequent execution procedure may also be implemented in another manner, in addition to the manner of S606a to S608a or the manner of S606b to S610b. The following introduces two specific implementation manners.

Manner 1: The core network control entity retains a signaling connection to the user equipment after sending, in S606a to the user equipment, the TAU/RAU accept message including the first indication information or the second indication information, and establishes a user plane bearer or PDP context at the same time when sending, to the user equipment, the TAU/RAU accept message including the first indication information or the second indication information. Specifically, when returning, to the user equipment, the TAU/RAU accept message carrying the first indication information or the second indication information, the core network control entity simultaneously executes a process of establishing E-RABs of all bearers or RABs of all PDP contexts, for example, for an SAE network, it refers to establishing of radio bearers that are between the user equipment and an eNodeB and are corresponding to all bearers, and establishing of an S1 user plane connection between the eNodeB and an SGW; and for a UMTS network, it refers to establishing of radio bearers that are between the user equipment and an RNC and are corresponding to all PDP contexts, and establishing of an Iu user plane connection between the RNC and an SGSN. For a bearer for which no E-RAB/RAB is successfully established, the user equipment and the network release the bearer or the PDP context. After the eNodeB/RNC finishes establishing the E-RAB/RAB, the core network control entity instructs the server to send, to the user equipment, the downlink data that is buffered and is to be sent to the user equipment, and the server sends corresponding data to the user equipment according to the instruction of the core network control entity.

Manner 2: When a current access network of the user equipment is a GPRS network, if the current user equipment has no PDP context information, after receiving the TAU/RAU accept message carrying the first indication information or the second indication information, the user equipment initiates a process of activating a PDP context, so as to establish a PDP context. After establishing of the PDP context is complete, that is, an SGSN receives an active PDP context accept (active PDP context accept) message sent by the user equipment, the SGSN instructs the server to send, to the user equipment, the downlink data that is buffered and is to be sent to the user equipment, and the server sends corresponding data to the user equipment according to the instruction of the core network control entity. Data is sent to the user equipment by using the established PDP context. A parameter used by the user equipment to initiate the process of activating the PDP context may be preconfigured on the user equipment.

It should be also understood that the process described in the method 600 for transmitting data in the embodiment of the present invention is also applicable to an attach (attach) process of the user equipment, that is, after learning, by using an attach message, that the user equipment is already online or already enables a receiver, the core network control entity triggers the server to send the downlink data. This manner may be used in a case in which a user equipment is attached to a network again after being detached from the network. In this manner, a probability of triggering a server to send downlink data is increased, and in addition, an effect of saving power of the user equipment can be achieved.

For example, for a UMTS attach process, after receiving an attach request message from the user equipment, an SGSN determines whether the first indication information is stored. If the first indication information is stored, the SGSN may carry the first indication information or the second indication information in an attach accept message. After receiving the attach accept message that carries the first indication information or the second indication information and is sent by the SGSN, the user equipment remains in a communication-capable state, or further keeps an RRC connection unreleased, and the SGSN triggers the server to send downlink data to the user equipment. If the first indication information is not set, the SGSN may carry the third indication information in the attach accept message. After receiving the attach accept message carrying the third indication information indicating that there is no data to be sent to the user equipment, the user equipment disables the receiver or enters the power saving mode or shuts down. A specific procedure is consistent with the procedure of the method 600 for transmitting data in the foregoing embodiment. For brevity, details are not repeatedly described herein.

For another example, for a 4G attach process, after receiving an attach request message from the user equipment, an MME determines whether the first indication information is set. If the first indication information is set, the MME may add the first indication information or the second indication information to an attach accept message. After receiving the attach accept message that carries the first indication information or the second indication information and is sent by the MME, the user equipment keeps the receiver enabled, or further keeps an RRC connection unreleased and keeps an E-RAB unreleased, and waits for the server to send downlink data, and the MME triggers the server to send downlink data to the user equipment. If the first indication information is not stored, the third indication information indicating that there is no data to be sent to the user equipment may be carried in the attach accept message. After receiving the attach accept message carrying the third indication information, the user equipment disables the receiver or enters the power saving mode or shuts down. A specific procedure is consistent with the procedure of the method 600 in the foregoing embodiment. For brevity, details are not repeatedly described herein.

The embodiment of the present invention may also be applied to a scenario in which a core network control entity (MME or SGSN) serving a user equipment changes. A specific implementation manner is similar to the method 600, except that when the server sends the first indication information to a source core network control entity in S602 and the core network control entity changes, after the user equipment sends a TAU/RAU request message to a new core network control entity in S603, the new core network control entity needs to acquire information about the user equipment from the source core network control entity, and the source core network control entity returns the information about the user equipment; and when the first indication information indicating that the server buffers the downlink data to be sent to the user equipment is included in the information about the user equipment, the new core network control entity acquires and sets the first indication information. Other procedures are consistent with those of the method 600. For brevity, details are not repeatedly described herein.

Figure 7:
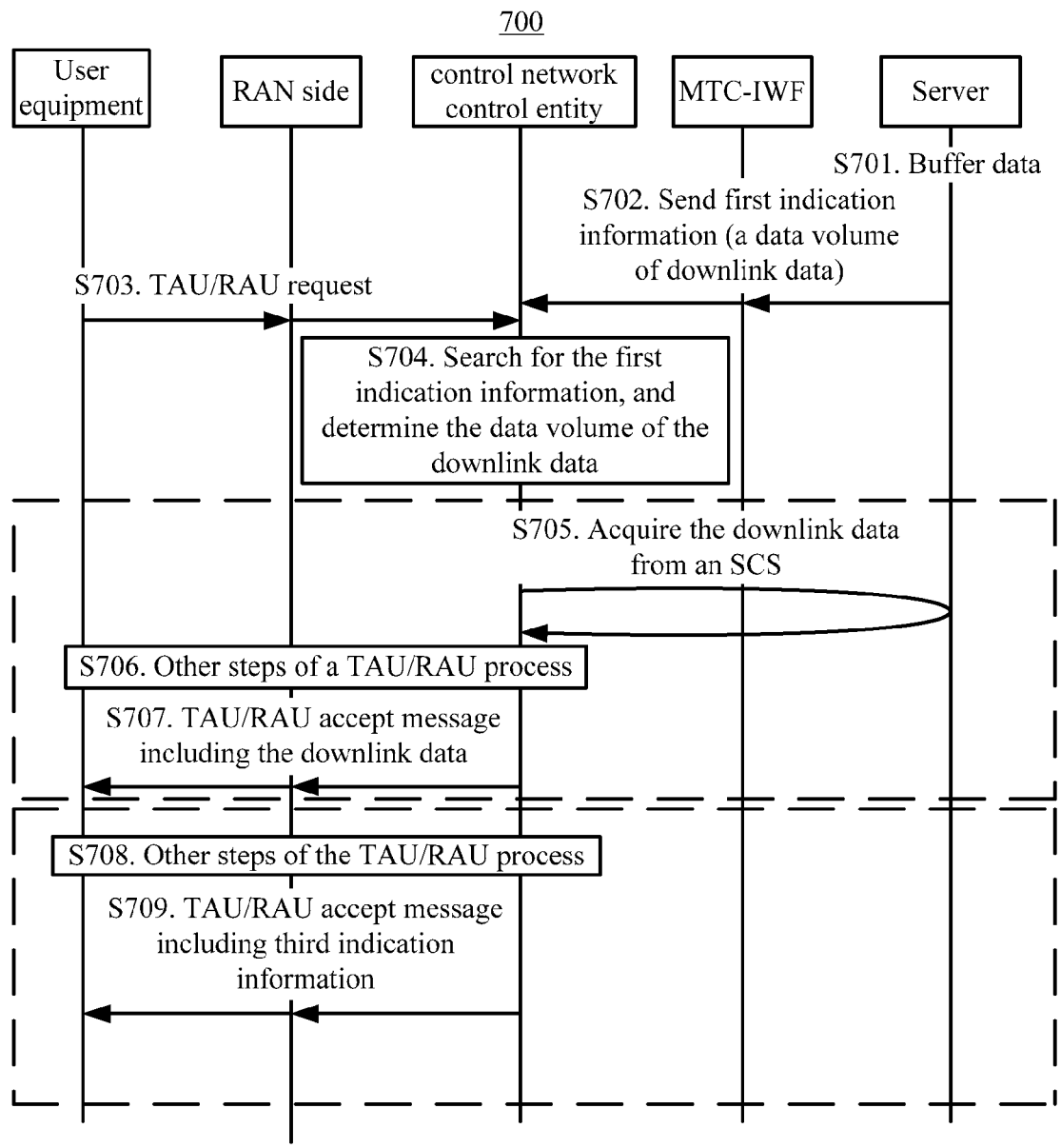
FIG. 7 is a schematic flowchart of a method for transmitting data according to another embodiment of the present invention.

FIG. 7 is a schematic flowchart of a method 700 for transmitting data according to an embodiment of the present invention. As shown in FIG. 7, the method 700 may include:

S701: A server (for example, an SCS or an MTC SERVER) has downlink data to be sent to a user equipment, and the server buffers corresponding downlink data because current time is beyond a range of time in which the server is allowed to send data to the user equipment.

S702: The server sends first indication information (namely, the data buffering indication information described above) to a core network control entity to which the user equipment is currently attached, where the first indication information indicates that the server buffers the downlink data to be sent to the user equipment, and the first indication information further indicates a volume of the buffered data to be sent to the user equipment. In the embodiment of the present invention, the data buffering indication information described above is the first indication information described herein, which means that the core network control entity directly stores the data buffering indication information sent by the server as the first indication information.

S703: The user equipment starts to execute a TAU/RAU process and send a TAU/RAU request message to the core network control entity.

S704: After receiving the TAU/RAU request message sent by the user equipment, the core network control entity checks whether the first indication information indicating that the server buffers the downlink data to be sent to the user equipment is stored. If the first indication information is stored, the core network control entity further checks whether the data volume of the downlink data that is buffered in the server and is to be sent to the user equipment conforms to a volume of data transferred by using an NAS message (a TAU/RAU accept message), and if yes, S705 to S707 are executed, and if not, reference may be made to the method 600 to execute a subsequent procedure; and if the core network control entity determines that the first indication information is not stored in the core network control entity, S708 and S709 are executed.

S705: The core network control entity decides to use a solution of sending, to the user equipment by using an NAS message, the downlink data that is buffered in the server and is to be sent to the user equipment. First, the core network control entity sends instruction information to the server to instruct the server to send, to the core network control entity, the buffered downlink data to be sent to the user equipment, where the server may send, to the core network control entity by using a control plane response message, the buffered downlink data to be sent to the user equipment. For a UMTS network, after receiving the instruction information of the core network control entity, the server may also send, to the core network control entity by using a user plane, the buffered downlink data to be sent to the user equipment.

S706: The core network control entity executes other steps of the TAU/RAU process, where S705 and S706 may be executed simultaneously.

S707: The core network control entity returns a TAU/RAU accept message to the user equipment and adds the downlink data to be sent to the user equipment to the TAU/RAU accept message. In this way, the downlink data may be sent to the user equipment by using NAS signaling (a TAU/RAU accept response message).

S708: If the first indication information indicating that the server buffers the downlink data to be sent to the user equipment is not stored in the core network control entity, the core network control entity executes other steps of TAU/RAU according to a normal procedure.

S709: The core network control entity generates third indication information indicating that there is no data to be sent to the user equipment, and sends the third indication information to the user equipment by using a TAU/RAU accept message. After receiving the TAU/RAU accept message that carries the third indication information and is sent by the core network control entity, the user equipment disables a receiver or enters a power saving mode or shuts down, so as to achieve a power saving effect.

It should be understood that, the method 700 for transmitting data according to the embodiment of the present invention may also be used in a process in which a user equipment attaches to a network again after detaching from the network, that is, after learning, by using an attach (attach) message, that the user equipment is already online or already enables a receiver, the core network control entity (an MME or an SGSN) determines whether there is downlink data to be sent to the user equipment, and if there is downlink data to be sent to the user equipment, acquires the downlink data from the server, uses an attach accept (attach accept) message to carry the downlink data, and sends the downlink data to the user equipment. For other steps, reference may be made to the method 700. For brevity, details are not repeatedly described herein.

Figure 8:
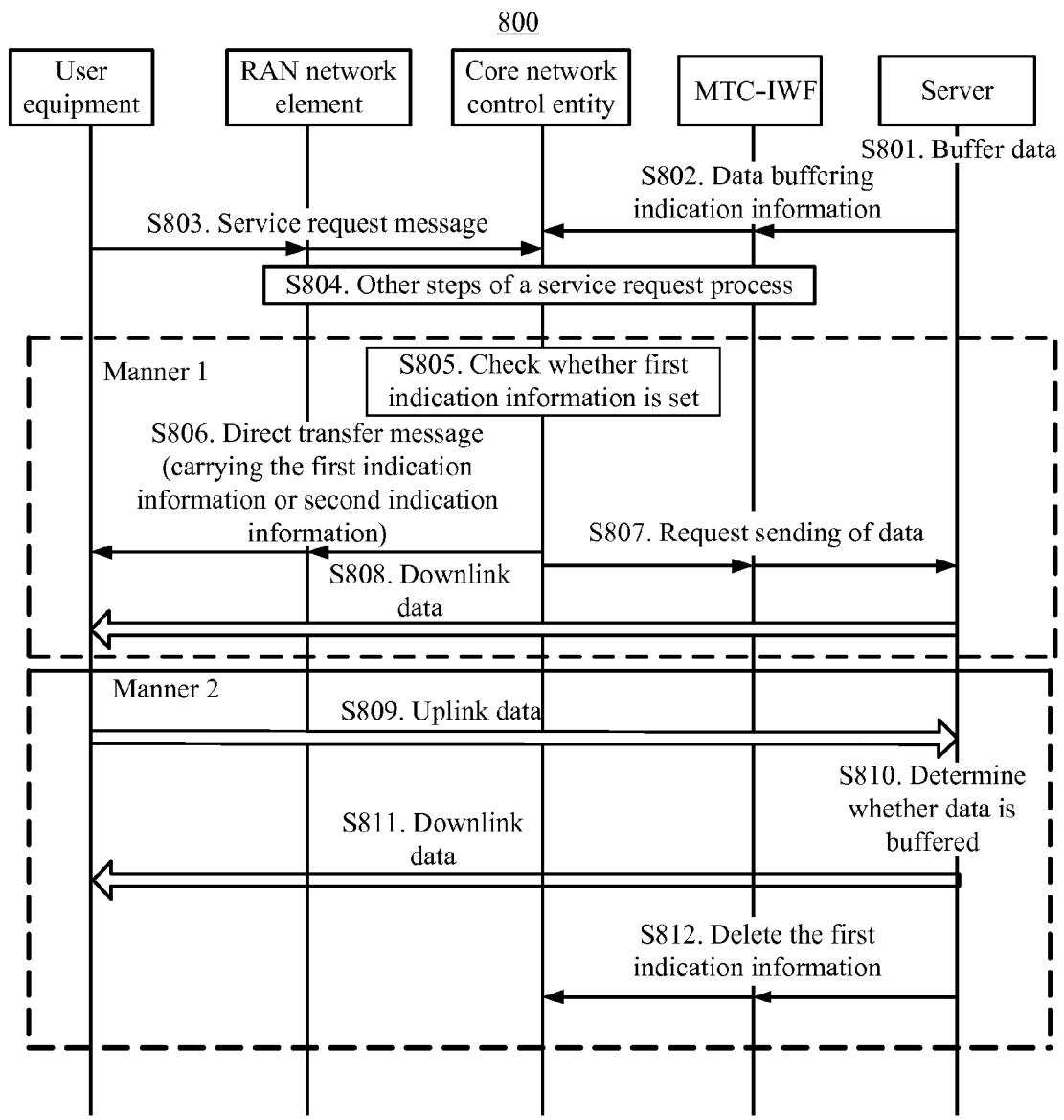
FIG. 8 is a schematic flowchart of a method for transmitting data according to another embodiment of the present invention.

FIG. 8 is a schematic flowchart of a method 800 for transmitting data according to an embodiment of the present invention. As shown in FIG. 8, the method 800 may include:

S801: A server (for example, an SCS or an MTC SERVER) has downlink data to be sent to a user equipment, and the server buffers corresponding downlink data because current time is beyond a range of time in which the server is allowed to send data to the user equipment.

S802: The server sends data buffering indication information to a core network control entity to which the user equipment is currently attached, where the data buffering indication information indicates that the server buffers the downlink data to be sent to the user equipment. After receiving the data buffering indication information sent by the server, the core network control entity may set first indication information that is used to indicate that the server buffers the downlink data to be sent to the user equipment.

S803: When having data to send, the user equipment initiates a service request, where the service request may be sent to the core network control entity by using an RAN entity.

S804: Execute other steps of a service request process, so as to activate a PDP context a bearer.

S805: The core network control entity checks whether the first indication information indicating that the server buffers the downlink data to be sent to the user equipment is set.

S806: If the first indication information is set, the first indication information may be sent to the user equipment by using a direct transfer (direct transfer) message, or second indication information indicating that the downlink data is to be sent to the user equipment may also be generated, and the second indication information may be sent to the user equipment by using a direct transfer message. In particular, for a UMTS network, in a case in which an objective of the service request is to transmit data, the first indication information or the second indication information may be sent to the user equipment by using a service accept message. In this way, S805 and S806 may be integrated into S804 for implementation.

After receiving the indication information, the user equipment does not release an RRC connection and the PDP context or the bearer within a specified period of time. The specified period of time does not conflict with a service process, that is, the user equipment does not initiate a PDP context or bearer release process when the specified period of time expires but the service process does not end.

S807: The core network control entity instructs the server to send, to the user equipment, the buffered downlink data to be sent to the user equipment, where S806 and S807 may be executed simultaneously, or S807 may be first executed, and then S806 is executed, which depends on a specific case, and is not limited in the embodiment of the present invention.

S808: The server sends the downlink data buffered for the user equipment to the user equipment, and the core network control entity deletes the stored first indication information indicating that the server buffers the downlink data to be sent to the user equipment.

The following describes, with reference to S809 to S812, a method for transmitting data according to another implementation manner of the present invention.

S809: After activating the PDP context or the bearer in the service request process, the user equipment may send uplink data to the server.

S810: After receiving the uplink data sent by the user equipment, the server determines whether the downlink data to be sent to the user equipment is buffered, and if the downlink data to be sent to the user equipment is buffered, the server sends, to the user equipment, the buffered downlink data to be sent to the user equipment, where the downlink data may be transmitted by using the established PDP context or bearer on a network.

S811: The server sends, to the user equipment, the buffered downlink data to be sent to the user equipment.

S812: The server instructs the core network control entity to delete the stored first indication information, and the core network control entity is a core network control entity currently serving the user equipment.

Figure 9A:
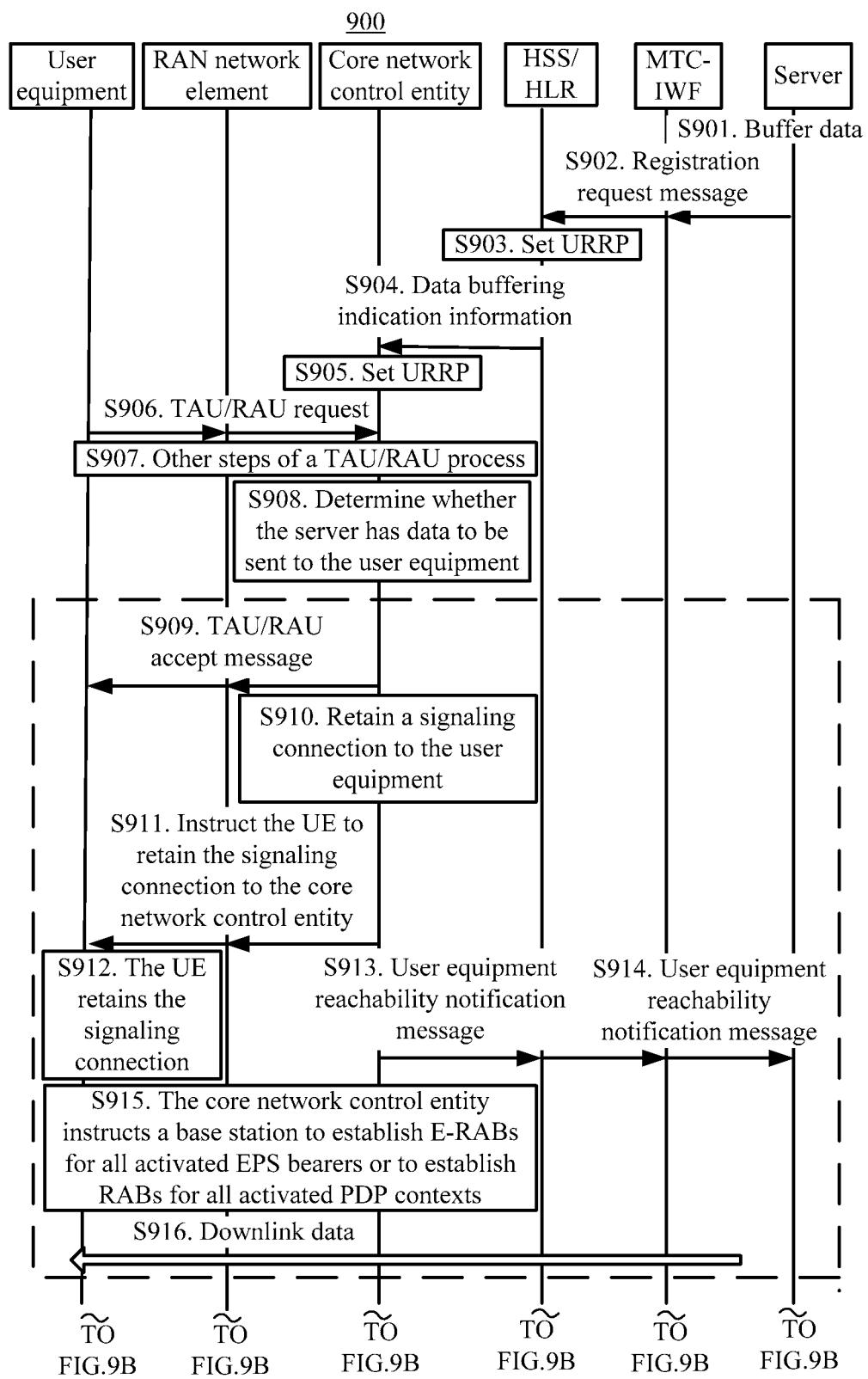
FIG. 9A and FIG. 9B are a schematic flowchart of a method for transmitting data according to another embodiment of the present invention.
Figure 9B:
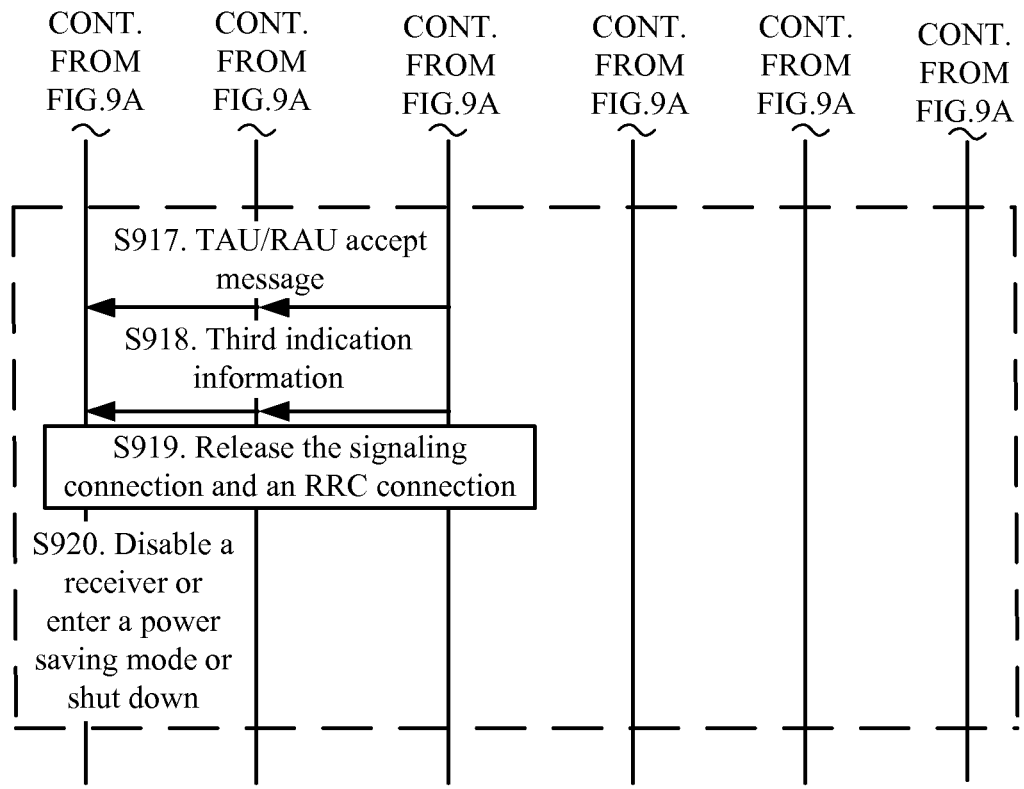

FIG. 9A and FIG. 9B are a schematic flowchart of a method 900 for transmitting data according to an embodiment of the present invention. As shown in FIG. 9A and FIG. 9B, the method 900 includes:

S901: A server (for example, an SCS or an MTC SERVER) has downlink data to be sent to a user equipment, and the server buffers corresponding downlink data because current time is beyond a range of time in which the server is allowed to send data to the user equipment.

S902: When buffering the downlink data, the server simultaneously sends a registration request message (namely, the user equipment reachability notification request message described above) to a home subscriber server (HSS) or home location register (HLR) to which the user equipment belongs, so as to acquire a user equipment reachability notification message, where the registration request message may be sent to the HSS or the HLR by using an MTC-IWF. The registration request message at least includes address information of the server and identity information of the user equipment, and may further include a validity period of to-be-sent data.

S903: According to the registration request message of the server, the HSS or the HLR stores the address information of the server and the identity information of the user equipment, and if the registration request message includes a validity period of to-be-sent data, may further store the validity period of the to-be-sent data, and at the same time sets a URRP (UE Reachability Request Parameter) user equipment reachability request parameter identifier, indicating that user equipment reachability information needs to be learnt and also indicating that there is downlink data to be sent to the user equipment. That the user equipment subsequently sends a TAU/RAU request or sends uplink data indicate that the user equipment is reachable. This specification uses sending of a TAU/RAU request message as an example for description.

S904: The HSS or the HLR sends, according to the registration request message of the server, a user equipment reachability notification request message to a core network control entity to which the user equipment belongs, where the user equipment reachability notification request message may include the identity information of the user equipment.

S905: After receiving the user equipment reachability notification request message, the core network control entity sets a URRP (namely, the first indication information described above), which may indicate that the server has the downlink data to be sent to the user equipment and may also indicate that when the UE is reachable, the core network control entity needs to notify the HSS or the HLR.

When the registration request message includes a validity period of to-be-sent data, the HSS or the HLR may store the validity period of the to-be-sent data. If the validity period of the to-be-sent data expires and the data is not sent yet, the HSS or the HLR may delete the URRP identifier, and instruct the core network control entity to delete the stored URRP identifier.

S906: The user equipment sends a TAU/RAU request to the core network control entity.

S907: The core network control entity executes a normal procedure of a TAU/RAU process.

S908: The core network control entity checks whether the URRP identifier is set. If the URRP is set, S909 to S916 are executed; otherwise, S917 to S920 are executed.

For a time-controlled user equipment, the core network control entity needs to further check whether current time is allowed communication time for the user equipment. If the current time is within a range of allowed communication time, S909 to S916 are executed; otherwise, the TAU/RAU process is implemented according to the prior art.

S909: The core network control entity returns a TAU/RAU accept message.

S910: The core network control entity keeps a signaling connection to the user equipment unreleased, that is, does not send an S1 release request or Iu release request message to an RAN side entity.

S911: The core network control entity sends, according to a detected URRP, to the user equipment, indication information (namely, the second indication information described above) indicating that there is downlink data to be sent to the user equipment, so that the user equipment keeps the signaling connection unreleased. The indication information may be carried in a new NAS message (for example, a downlink NAS transport message (downlink NAS transport message)) and sent to the UE by using the new NAS message.

Certainly, the indication information may also be carried in the TAU/RAU accept message in S909 and sent to the user equipment.

S912: After receiving the indication information that is sent by the core network control entity and indicates that there is downlink data to be sent to the user equipment, the user equipment keeps the signaling connection unreleased, that is, does not start a timer T3440/T3340; and if the timer T3440/T3340 has been started after the user equipment receives the TAU/RAU accept message, the user equipment deletes the timer T3440 after receiving the indication information.

S913: The core network control entity sends the user equipment reachability notification message to the HSS or the HLR according to the detected identifier, namely, the URRP, so as to notify that the user equipment is reachable. S911 and S913 may be executed simultaneously, and no sequence is set.

S914: The HSS or the HLR sends the user equipment reachability notification message to a specified server according to information related to the UE and stored in the HSS or HLR, so as to notify that the user equipment is reachable, and trigger the server to send the downlink data stored in server to the user equipment.

S915: After determining that the URRP identifier exists, the core network control entity activates E-RABs/RABs that are on a radio side and are corresponding to all bearers or PDP contexts, that is, executes a process of establishing E-RABs/RABs of all activated bearers/PDP contexts. For a SAE network, it refers to establishing of a radio bearer between the UE and an eNodeB and establishing of an S1 user plane connection between the eNodeB and an SGW; and for a UMTS network, it refers to establishing of a radio bearer between the UE and an RNC and establishing of an Iu user plane connection between the RNC and an SGSN. For a bearer for which no E-RAB/RAB is successfully established, the UE and the network release the bearer or the PDP context. This step is an optional step. If this step is executed, S913a and S914 are executed after this step. A process of establishing a user plane bearer may also be executed according to other manners described in other embodiments, and details are not repeatedly described herein.

S916: The server sends the stored downlink data to the user equipment.

S917: The core network control entity returns a TAU/RAU accept message.

The following describes, with reference to S917 to S922, a subsequent execution procedure of the method 900 for transmitting data according to the embodiment of the present invention when the core network control entity determines that the server has no downlink data to be sent to the user equipment.

S917: The core network control entity returns a TAU/RAU accept message.

S918: If the core network control entity does not store the URRP identifier, the core network control entity sends, to the user equipment, third indication information indicating that the server has no downlink data to be sent, where the third indication information may be implemented in the following manners:

the third indication information is carried in a new NAS message, for example, a downlink NAS transport message (a downlink NAS transport message) and sent to the UE; and the indication information is carried in the TAU/RAU accept message in S917 and sent to the UE.

The third indication information is used to instruct the UE to enter a power saving state, that is, disable a receiver or enter another power saving state or shut down, after the TAU/RAU process is implemented.

S919: The core network control entity initiates an S1 or Iu signaling connection release process, and the RAN side entity initiates an RRC connection release process.

S920: After releasing an RRC connection, the user equipment disables the receiver or enters another power saving mode or shuts down according to the third indication information received in S918.

It should be understood that, the foregoing description is merely specific embodiments of the present invention, and should not constitute any limitations on the present invention. For example, for the method 900, S911 and S912 may not be executed, and the core network control entity may choose, according to duration in which the user equipment can retain a signaling connection, whether to send, to the user equipment, the indication information indicating that the server has the downlink data to be sent to the user equipment. For example, if the duration in which the user equipment can retain a signaling connection is 11 seconds, S911 and S912 may not be executed because 11 seconds is not less than a predetermined threshold of 10 seconds. The duration in which the user equipment can retain a signaling connection may be determined according to UE subscription data, a network configuration, or a UE report. If the core network control entity does not send the indication information to the user equipment, the user equipment may retain the signaling connection for a predetermined period of time, so as to wait to receive the downlink data sent by the server. The UE may enter an idle mode or a power saving state, or shut down after retaining the signaling connection for the predetermined period of time, so as to further save power. For another example, in the method 900, whether the to-be-sent data expires is determined according to the validity period, of the downlink data, carried in the registration request message. In the method according to the embodiment of the present invention, the validity period of the downlink data may also not be carried in the registration request message, and instead, the server directly sends a user equipment reachability notification cancellation message to the HSS or the HLR when determining that the validity period of the downlink data expires. After receiving the user equipment reachability notification cancellation message sent by the server, the HSS or the HLR may delete the URRP identifier stored in the HSS or the HLR, and instruct the core network control entity to delete the stored URRP identifier. In the embodiment of the present invention, when multiple servers need to send data to the user equipment, after receiving a user equipment reachability notification cancellation message sent by any server or determining that data to be sent by any server to the user equipment expires, the home subscriber server or the home location register may delete user equipment reachability-related information of the any server. After deleting all user equipment reachability-related information of the multiple servers, that is, there is no notification request for user equipment reachability, the home subscriber server or the home location register deletes the URRP identifier stored in the home subscriber server or the home location register and instructs the core network control entity to delete the stored URRP identifier.

It should be also understood that, sequence numbers of the processes in the foregoing methods do not imply execution sequences. The execution sequences of the processes should be determined by functions and internal logic, and should not constitute any limitation on implementation processes of the embodiments of the present invention.

The foregoing already describes schematic flowcharts of the methods for transmitting data according to the embodiments of the present invention with reference to FIG. 1 to FIG. 9B. The following describes apparatuses for transmitting data according to the embodiments of the present invention with reference to FIG. 10 to FIG. 19, where the apparatuses include a core network control entity, a user equipment, and a server.

Figure 10:
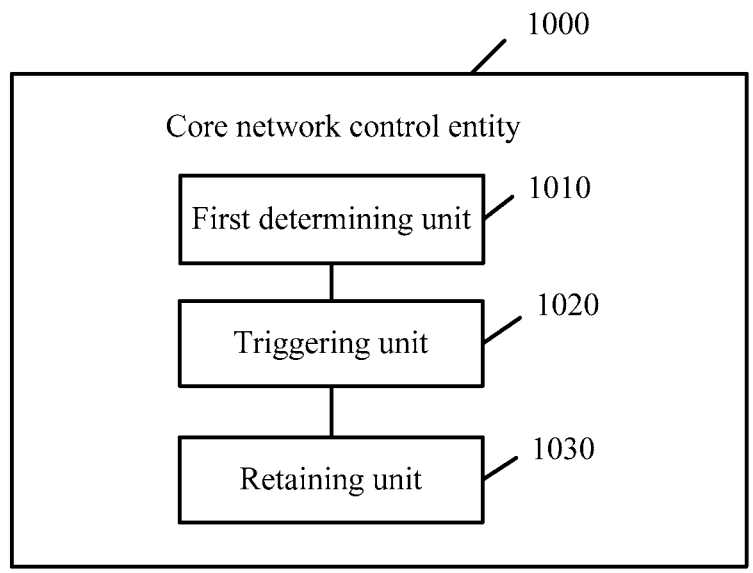
FIG. 10 is a schematic block diagram of a core network control entity according to an embodiment of the present invention.

FIG. 10 is a schematic block diagram of a core network control entity 1000 according to an embodiment of the present invention. As shown in FIG. 10, the core network control entity 1000 includes:

a first determining unit 1010, configured to: after receiving a first message sent by a user equipment, determine whether first indication information is set, where the first indication information indicates that a server buffers downlink data to be sent to the user equipment; and a triggering unit 1020, configured to: when the first determining unit determines that the first indication information is set, trigger the server that buffers the downlink data to send the downlink data to the user equipment;

a retaining unit 1030, configured to: when the first determining unit determines that the first indication information is set, retain a signaling connection to the user equipment.

Therefore, after receiving the first message sent by the user equipment, the core network control entity according to the embodiment of the present invention determines whether the first indication information is set, where the first indication information indicates that the server buffers the downlink data to be sent to the user equipment, and retains the signaling connection to the user equipment when determining that the first indication information is set, which can reduce signaling consumption in a process of sending downlink data, and avoid a process of disconnecting and reestablishing a signaling connection between a user equipment and a network entity, thereby avoiding frequent status changes of the user equipment and the network entity, and saving power of the user equipment.

Optionally, the triggering unit 1020 is specifically configured to:

send a downlink data delivery request message to the server that buffers the downlink data, so as to trigger the server that buffers the downlink data to send the downlink data to the user equipment; or the triggering unit 1020 is specifically configured to:

send a first user equipment reachability notification message to a home subscriber server or home location register to which the user equipment belongs, so that the home subscriber server or the home location register sends a second user equipment reachability notification message to the server that buffers the downlink data, so as to trigger the server that buffers the downlink data to send the downlink data to the user equipment.

Optionally, the retaining unit 1030 is specifically configured to:

send a second message including second indication information to the user equipment, where the second indication information indicates that there is data to be sent to the user equipment, so as to retain the signaling connection to the user equipment.

Optionally, the retaining unit 1030 is specifically configured to:

when duration, preset for the user equipment, in which a signaling connection can be retained is less than a predetermined threshold, send the second message to the user equipment.

Figure 11:
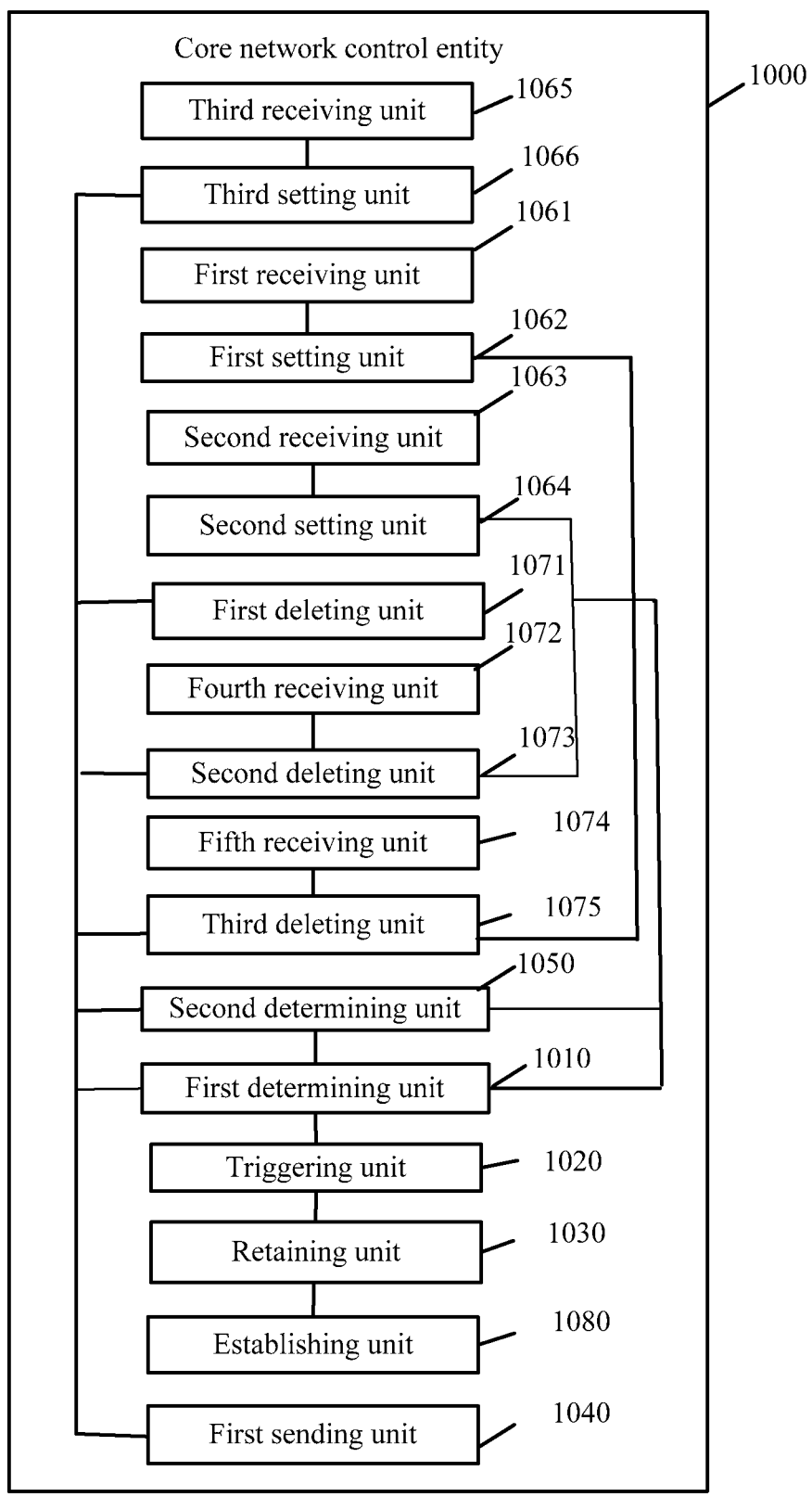
FIG. 11 is a schematic block diagram of a core network control entity according to another embodiment of the present invention.

Optionally, as shown in FIG. 11, the core network control entity 1000 further includes:

a first sending unit 1040, configured to: when it is determined that the first indication information is not set, send a third message including third indication information to the user equipment, where the third indication information indicates that there is no downlink data to be sent to the user equipment, so that the user equipment disables a receiver or enters a power saving mode or shuts down according to the third indication information.

Optionally, the second indication information further includes address information of the server.

Optionally, as shown in FIG. 11, the core network control entity 1000 further includes:

a second determining unit 1050, configured to: when the user equipment is a time-controlled user equipment, determine whether the current time is within a range of allowed communication time, where the first determining unit 1010 is specifically configured to:

when the second determining unit 1050 determines that the current time is within the range of allowed communication time of the user equipment, determine whether the first indication information is set.

Optionally, the core network control entity 1000 further includes:

a first receiving unit 1061, configured to receive a second user equipment reachability notification request message that is sent by the home subscriber server or home location register to which the user equipment belongs after the home subscriber server or home location register receives a first user equipment reachability notification request message, and a first setting unit 1062, configured to set the first indication information according to the second user equipment reachability notification request message received by the first receiving unit; or includes:

a second receiving unit 1063, configured to receive data buffering indication information sent by the server that buffers the downlink data, where the data buffering indication information indicates that the server buffers the downlink data to be sent to the user equipment, and a second setting unit 1064, configured to set the first indication information according to the data buffering indication information.

Optionally, as shown in FIG. 11, the core network control entity 1000 further includes:

a third receiving unit 1065, configured to receive a context response message sent by a source core network control entity serving the user equipment; and a third setting unit 1066, configured to: when the context response message received by the third receiving unit includes the first indication information, set the first indication information.

Optionally, as shown in FIG. 11, the core network control entity 1000 further includes:

a first deleting unit 1071, configured to: when determining, according to the first indication information, that a validity period of the downlink data expires, delete the first indication information, where the first indication information is further used to indicate the validity period of the downlink data, and the validity period, indicated by the first indication information, of the downlink data is set according to a validity period, of the downlink data, carried in the data buffering indication information sent by the server that buffers the downlink data; or includes:

a fourth receiving unit 1072, configured to receive a fourth message that is sent, after a validity period of the downlink data expires, by the server that buffers the downlink data, where the fourth message is used as an instruction to delete the first indication information, and a second deleting unit 1073, configured to delete the first indication information according to the fourth message received by the fourth receiving unit; or includes:

a fifth receiving unit 1074, configured to receive a first user equipment reachability notification cancellation message sent by the home subscriber server or home location register to which the user equipment belongs, and a third deleting unit 1075, configured to delete the first indication information according to the first user equipment reachability notification cancellation message received by the fifth receiving unit 1074.

Optionally, the fifth receiving unit 1074 is specifically configured to:

receive the first user equipment reachability notification cancellation message that is sent by the home subscriber server or the home location register according to a second user equipment reachability notification cancellation message sent by the server that buffers the downlink data of the user equipment; or is specifically configured to:

receive the first user equipment reachability notification cancellation message that is sent by the home subscriber server or the home location register after the home subscriber server or the home location register determines, according to the first user equipment reachability notification request message, that the downlink data expires, where the first user equipment reachability notification request message carries the validity period of the downlink data.

Optionally, as shown in FIG. 11, the core network control entity 1000 further includes:

an establishing unit 1080, configured to: after a downlink data notification message or downlink data sent by the server that buffers the downlink data is received, establish an evolved universal terrestrial radio access network radio access bearer corresponding to a bearer for transmitting a corresponding data packet or establish a radio access bearer corresponding to a Packet Data Protocol context for transmitting a corresponding data packet; or, configured to establish a user plane bearer or a Packet Data Protocol context.

Figure 12:
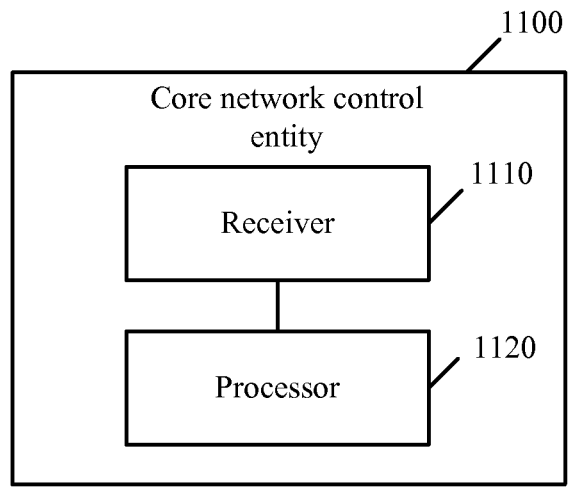
FIG. 12 is a schematic block diagram of a core network control entity according to another embodiment of the present invention.

FIG. 12 is a schematic block diagram of a core network control entity 1100 according to an embodiment of the present invention. As shown in FIG. 12, the core network control entity 1100 includes:

a receiver 1110, configured to receive a first message sent by a user equipment; and a processor 1120, configured to: after the receiver 1110 receives the first message sent by the user equipment, determine whether first indication information is set, where the first indication information indicates that a server buffers downlink data to be sent to the user equipment; and when determining that the first indication information is set, retain a signaling connection to the user equipment and trigger the server that buffers the downlink data to send the downlink data to the user equipment.

Therefore, after receiving the first message sent by the user equipment, the core network control entity in the embodiment of the present invention determines whether the first indication information is set, where the first indication information indicates that the server buffers the downlink data to be sent to the user equipment, and retains the signaling connection to the user equipment when determining that the first indication information is set, so that power of the user equipment can be saved.

Figure 13:
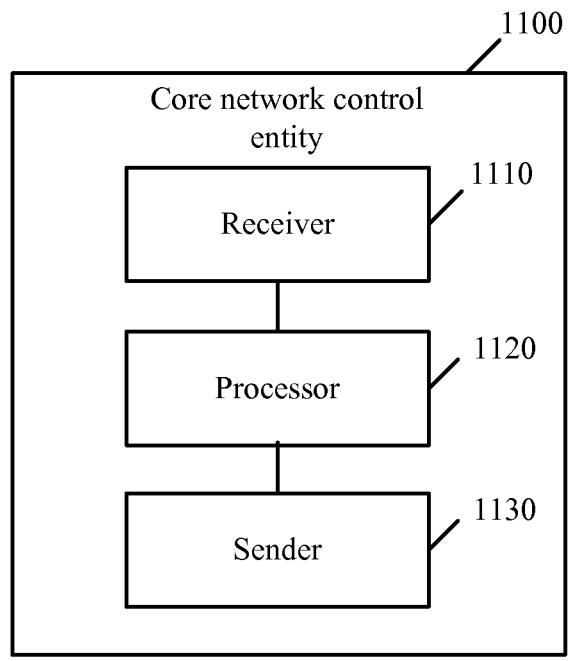
FIG. 13 is a schematic block diagram of a core network control entity according to another embodiment of the present invention.

Optionally, as shown in FIG. 13, the core network control entity 1100 further includes a sender 1130, where the processor 1120 is specifically configured to instruct the sender 1130 to send a downlink data delivery request message to the server that buffers the downlink data, so as to trigger the server that buffers the downlink data to send the downlink data to the user equipment; and the sender 1130 is configured to send, according to the instruction of the processor 1120, the downlink data delivery request message to the server that buffers the downlink data, so as to trigger the server that buffers the downlink data to send the downlink data to the user equipment; or the processor 1120 is specifically configured to instruct the sender 1130 to send a first user equipment reachability notification message to a home subscriber server or home location register to which the user equipment belongs, so that the home subscriber server or the home location register sends a second user equipment reachability notification message to the server that buffers the downlink data, and therefore the server that buffers the downlink data sends the downlink data to the user equipment; and the sender 1130 is configured to send, according to the instruction of the processor 1120, the first user equipment reachability notification message to the home subscriber server or home location register to which the user equipment belongs.

Optionally, as shown in FIG. 13, the core network control entity 1100 further includes a sender 1130, where the processor 1120 is specifically configured to instruct the sender 1130 to send a second message including second indication information to the user equipment, where the second indication information indicates that there is data to be sent to the user equipment, so as to retain a signaling connection to the user equipment; and the sender 1130 is configured to send, according to the instruction of the processor 1120, the second message including the second indication information to the user equipment, where the second indication information indicates that there is the data to be sent to the user equipment, so as to retain the signaling connection to the user equipment.

Optionally, the processor 1120 is specifically configured to: when determining that duration, preset for the user equipment, in which a signaling connection can be retained is less than a predetermined threshold, instruct the sender 1130 to send the second message to the user equipment.

Optionally, as shown in FIG. 13, the core network control entity 1100 further includes a sender 1130, where the processor is specifically configured to: when determining that the first indication information is not set, instruct the sender 1130 to send a third message including third indication information to the user equipment, where the third indication information indicates that there is no downlink data to be sent to the user equipment, so that the user equipment disables a receiver or enters a power saving mode or shuts down according to the third indication information; and the sender 1130 is configured to send, according to the instruction of the processor 1120, the third message including the third indication information to the user equipment, where the third indication information indicates that there is no downlink data to be sent to the user equipment, so that the user equipment disables a receiver or enters a power saving mode or shuts down according to the third indication information.

Optionally, the second indication information further includes address information of the server.

Optionally, the processor 1120 is further configured to: when the user equipment is a time-controlled user equipment, determine whether the current time is within a range of allowed communication time; and is specifically configured to: when determining that the current time is within the range of allowed communication time of the user equipment, determine whether the first indication information is set.

Optionally, the receiver 1110 is further configured to receive a second user equipment reachability notification request message that is sent by the home subscriber server or home location register to which the user equipment belongs after the home subscriber server or home location register receives a first user equipment reachability notification request message, and the processor 1120 is further configured to set the first indication information according to the second user equipment reachability notification request message received by the receiver 1110; or the receiver 1110 is further configured to receive data buffering indication information sent by the server that buffers the downlink data, where the data buffering indication information indicates that the server buffers the downlink data to be sent to the user equipment, and the processor 1120 is further configured to set the first indication information according to the data buffering indication information.

Optionally, the receiver 1110 is further configured to receive a context response message sent by a source core network control entity serving the user equipment, and the processor 1120 is further configured to set the first indication information when the context response message received by the receiver 1110 includes the first indication information.

Optionally, the processor 1120 is further configured to: when determining, according to the first indication information, that a validity period of the downlink data expires, delete the first indication information, where the first indication information is further used to indicate the validity period of the downlink data, and the validity period, indicated by the first indication information, of the downlink data is set according to a validity period, of the downlink data, carried in the data buffering indication information sent by the server that buffers the downlink data.

Optionally, the receiver 1110 is further configured to receive a fourth message that is sent, after a validity period of the downlink data expires, by the server that buffers the downlink data, where the fourth message is used as an instruction to delete the first indication information, and the processor 1120 is further configured to delete the first indication information according to the fourth message received by the receiver 1110.

Optionally, the receiver 1110 is further configured to receive a first user equipment reachability notification cancellation message sent by the home subscriber server or home location register to which the user equipment belongs, and the processor 1120 is further configured to delete the first indication information according to the first user equipment reachability notification cancellation message received by the receiver 1110.

Optionally, the receiver 1110 is specifically configured to:

receive the first user equipment reachability notification cancellation message that is sent by the home subscriber server or the home location register according to a second user equipment reachability notification cancellation message sent by the server that buffers the downlink data of the user equipment; or is specifically configured to:

receive the first user equipment reachability notification cancellation message that is sent by the home subscriber server or the home location register after the home subscriber server or the home location register determines, according to the first user equipment reachability notification request message, that the downlink data expires, where the first user equipment reachability notification request message carries the validity period of the downlink data.

Optionally, the receiver 1110 is further configured to receive a downlink data notification message or downlink data sent by the server that buffers the downlink data, and the processor 1120 is further configured to: after the receiver 1110 receives the downlink data notification message or downlink data sent by the server that buffers the downlink data, establish an evolved universal terrestrial radio access network radio access bearer corresponding to a bearer for transmitting a corresponding data packet or establish a radio access bearer corresponding to a Packet Data Protocol context for transmitting a corresponding data packet.

Optionally, the processor 1120 is further configured to establish a user plane bearer or a Packet Data Protocol context.

Therefore, after receiving the first message sent by the user equipment, the core network control entity in the embodiment of the present invention determines whether the first indication information is set, where the first indication information indicates that the server buffers the downlink data to be sent to the user equipment, and retains the signaling connection to the user equipment when determining that the first indication information is set, which can reduce signaling consumption in a process of sending downlink data, and avoid a process of disconnecting and reestablishing a signaling connection between a user equipment and a network entity, thereby avoiding frequent status changes of the user equipment and the network entity, and saving power of the user equipment. Further, when determining that the server has the downlink data to be sent to the user equipment, the core network control entity establishes a bearer required for sending the downlink data, thereby saving time required for transmitting the downlink data. Further, in the embodiment of the present invention, only after it is determined that the current time is within the range of allowed communication time of the user equipment, it is determined whether the first indication information is set, which reduces network load. Further, in the embodiment of the present invention, the first message may be a TAU/RAU request message, an attach request message, or a service request message, so that chances for the server to send buffered downlink data to the user equipment can be increased, which prevents data from becoming invalid or being deleted.

Figure 14:
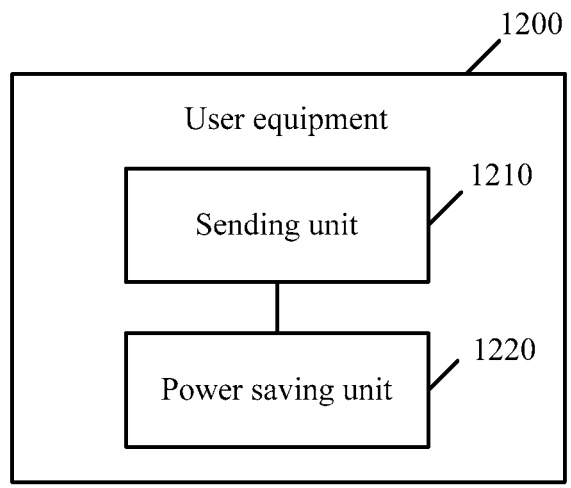
FIG. 14 is a schematic block diagram of a user equipment according to an embodiment of the present invention.

FIG. 14 is a schematic block diagram of a user equipment 1200 according to an embodiment of the present invention. As shown in FIG. 14, the user equipment 1200 includes:

a sending unit 1210, configured to send a first message to a core network control entity;

a power saving unit 1220, configured to: when receiving a third message that includes third indication information and is sent by the core network control entity according to the first message, disable a receiver or enable the user equipment to enter a power saving mode or shut down, where the third indication information indicates that a server has no downlink data to be sent to the user equipment.

Therefore, the user equipment according to the embodiment of the present invention sends the first message to the core network control entity, and after receiving the third message that includes the third indication information and is sent by the core network control entity according to the first message, disables the receiver or enters the power saving mode or shuts down, where the third indication information indicates that there is no downlink data to be sent to the user equipment, so that power of the user equipment can be saved.

Figure 15:
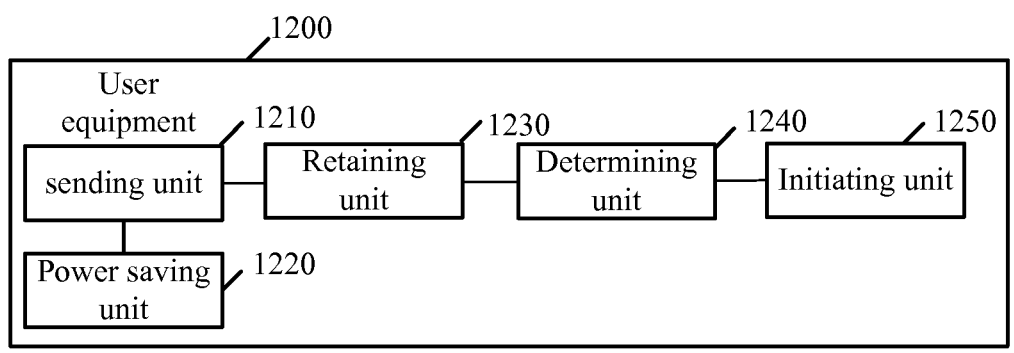
FIG. 15 is a schematic block diagram of a user equipment according to another embodiment of the present invention.

Optionally, as shown in FIG. 15, the user equipment 1200 further includes:

a retaining unit 1230, configured to: when receiving a second message that includes second indication information and is sent by the core network control entity according to the first message, retain an established signaling connection, so as to wait to receive the downlink data, where the second indication information indicates that the server has downlink data to be sent to the user equipment.

Optionally, as shown in FIG. 15, when the user equipment 1200 includes the retaining unit 1230, the user equipment further includes:

a determining unit 1240, configured to: when a current access network is a general packet radio service technology network, determine whether a Packet Data Protocol context is reserved; and an initiating unit 1250, configured to: when no Packet Data Protocol context is reserved, initiate a Packet Data Protocol context process, so as to establish a Packet Data Protocol context.

Therefore, the user equipment according to the embodiment of the present invention sends the first message to the core network control entity; after receiving the third message that includes the third indication information and is sent by the core network control entity according to the first message, disables the receiver or enters the power saving mode or shuts down, where the third indication information indicates that there is no downlink data to be sent to the user equipment; and after receiving the second message that includes the second indication information and is sent by the core network control entity according to the first message, retains the established signaling connection, so as to wait to receive the downlink data, where the second indication information indicates that there is downlink data to be sent to the user equipment, so that power of the user equipment can be saved.

Figure 16:
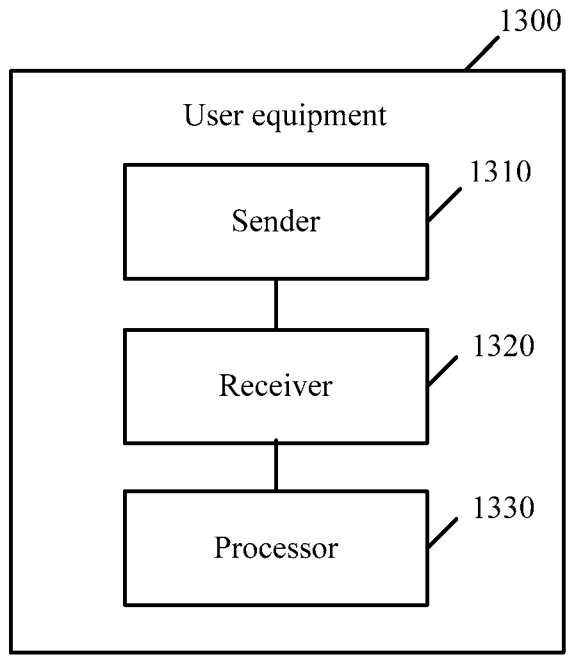
FIG. 16 is a schematic block diagram of a user equipment according to another embodiment of the present invention.

FIG. 16 is a schematic block diagram of a user equipment 1300 according to an embodiment of the present invention. As shown in FIG. 16, the user equipment 1300 includes:

a sender 1310, configured to send a first message to a core network control entity;

a receiver 1320, configured to receive a third message that includes third indication information and is sent by the core network control entity according to the first message, where the third indication information indicates that a server has no downlink data to be sent to the user equipment; and a processor 1330, configured to disable a receiver or enter a power saving mode or power off the user equipment when the receiver 1320 receives the third message.

Therefore, the user equipment according to the embodiment of the present invention sends the first message to the core network control entity, and after receiving the third message that includes the third indication information and is sent by the core network control entity according to the first message, disables the receiver or enters the power saving mode or shuts down, where the third indication information indicates that there is no downlink data to be sent to the user equipment, so that power of the user equipment can be saved.

Optionally, the receiver 1320 is further configured to receive a second message that includes second indication information and is sent by the core network control entity according to the first message, where the second indication information indicates that the server has downlink data to be sent to the user equipment.

The processor 1330 is further configured to retain an established signaling connection when the receiver receives the second message, so as to wait to receive the downlink data.

Optionally, the processor 1330 is further configured to: when a current access network is a general packet radio service technology network, determine whether a Packet Data Protocol context is reserved; and when no Packet Data Protocol context is reserved, initiate a Packet Data Protocol context process, so as to establish a Packet Data Protocol context.

Therefore, the user equipment according to the embodiment of the present invention sends the first message to the core network control entity; after receiving the third message that includes the third indication information and is sent by the core network control entity according to the first message, disables the receiver or enters the power saving mode or shuts down, where the third indication information indicates that there is no downlink data to be sent to the user equipment; and after receiving the second message that includes the second indication information and is sent by the core network control entity according to the first message, retains the established signaling connection, so as to wait to receive the downlink data, where the second indication information indicates that there is downlink data to be sent to the user equipment, so that power of the user equipment can be saved.

Figure 17:
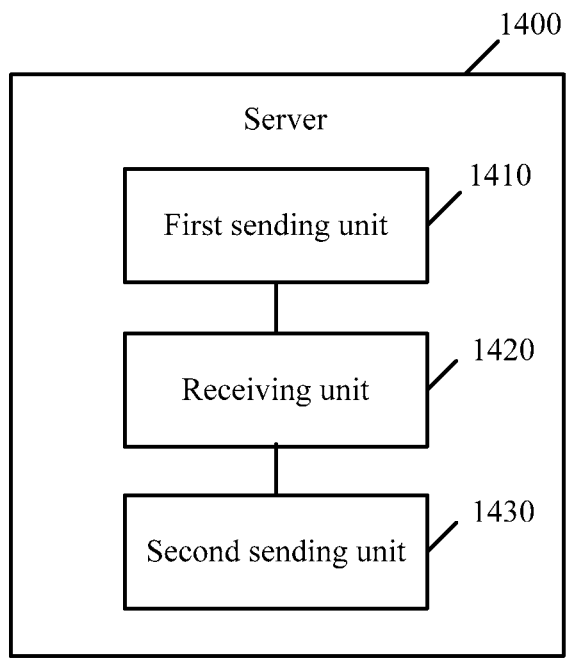
FIG. 17 is a schematic block diagram of a server according to an embodiment of the present invention.

FIG. 17 is a schematic block diagram of a server 1400 according to an embodiment of the present invention. As shown in FIG. 17, the server 1400 includes a first sending unit 1410, a receiving unit 1420, and a second sending unit 1430, where the first sending unit 1410 is configured to send a first user equipment reachability notification request message to a home subscriber server or home location register to which a user equipment belongs, so that the home subscriber server or the home location register sends a second user equipment reachability notification request message to a core network control entity to which the user equipment belongs, and therefore the core network control entity sets first indication information according to the second user equipment reachability notification request message, where the first indication information indicates that the server buffers downlink data to be sent to the user equipment; the receiving unit 1420 is configured to receive a second user equipment reachability notification message that is sent by the home subscriber server or the home location register after the home subscriber server or the home location register receives a first user equipment reachability notification message that is sent by the core network control entity according to the first indication information; and the second sending unit 1430 is configured to send the downlink data to the user equipment; or the first sending unit 1410 is configured to send data buffering indication information to a core network control entity to which a user equipment belongs, so that the core network control entity sets first indication information according to the data buffering indication information, where the data buffering indication information indicates that the server buffers downlink data to be sent to the user equipment and the first indication information indicates that the server buffers the downlink data to be sent to the user equipment; the receiving unit 1420 is configured to receive a downlink data delivery request message that is sent by the core network control entity according to the first indication information; and the second sending unit 1430 is configured to send the downlink data to the user equipment.

Figure 18:
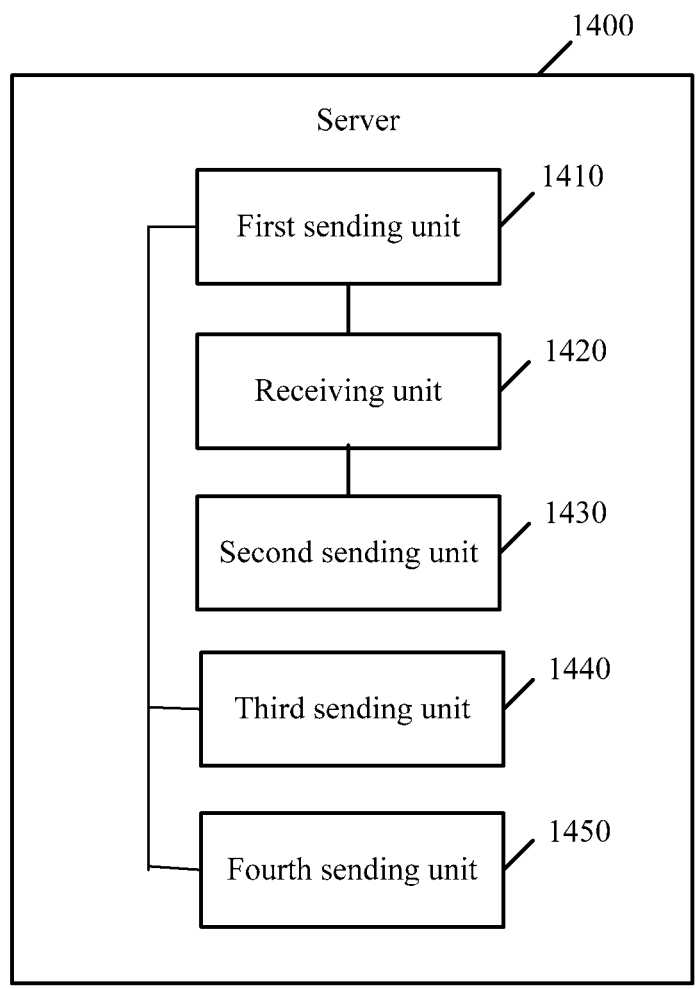
FIG. 18 is a schematic block diagram of a server according to another embodiment of the present invention.

Optionally, as shown in FIG. 18, the server 1400 further includes: a third sending unit 1440, configured to: when determining that the downlink data expires, send a second user equipment reachability notification cancellation message to the home subscriber server or the home location register, so that the home subscriber server or the home location register sends a first user equipment reachability notification cancellation message to the core network control entity, and therefore the core network control entity deletes the first indication information according to the first user equipment reachability notification cancellation message.

Optionally, the first user equipment reachability notification request message further includes a validity period of the downlink data, so that the home subscriber server sends a first user equipment reachability notification cancellation message to the core network control entity when determining, according to the first user equipment reachability notification request message, that the validity period of the downlink data expires, and therefore the core network control entity deletes the first indication information according to the first user equipment reachability notification cancellation message.

Optionally, as shown in FIG. 18, the server 1400 further includes: a fourth sending unit 1450, configured to: when determining that a validity period of the downlink data expires, send a fourth message to the core network control entity, where the fourth message is used to instruct the core network control entity to delete the first indication information.

Optionally, the data buffering indication information further includes a validity period of the downlink data, so that the core network control entity sets the first indication information that is further used to indicate the validity period of the downlink data, and deletes the first indication information when the validity period of the downlink data expires.

Therefore, the server according to the embodiment of the present invention sends the first user equipment reachability notification request message to the home subscriber server or the home location register, so that the home subscriber server or the home location register sends the second user equipment reachability notification request message to the core network control entity, and therefore the core network control entity sets the first indication information according to the second user equipment reachability notification request message, where the first indication information indicates that the server buffers the downlink data to be sent to the user equipment, and the server sends the downlink data to the user equipment when receiving a second user equipment reachability notification response message that is sent by the home subscriber server or the home location register after the home subscriber server or the home location register receives a first user equipment reachability notification response message that is sent by the core network control entity according to the first indication information; or sends the data buffering indication information to the core network control entity, so that the core network control entity sets the first indication information according to the data buffering indication information, where the data buffering indication information indicates that the downlink data to be sent to the user equipment is buffered and the first indication information indicates that another entity has downlink data to be sent to the user equipment, and the another entity sends the downlink data to the user equipment when receiving a request message that is sent by the core network control entity according to the first indication information and triggers the downlink data, which can save power of the user equipment.

Figure 19:
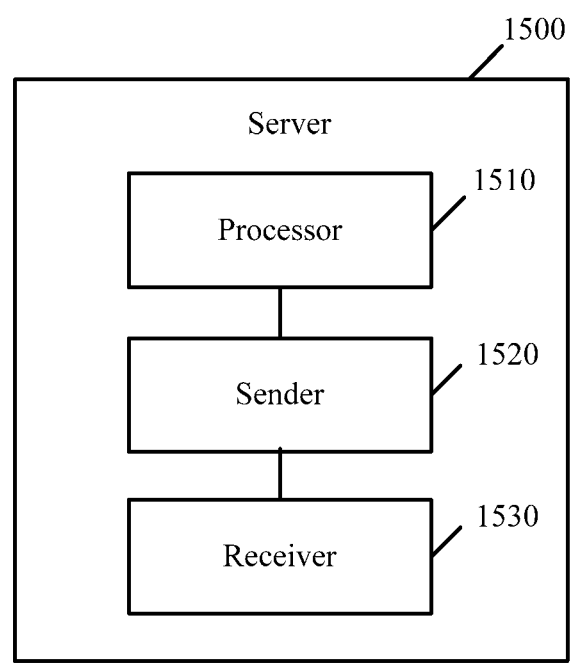
FIG. 19 is a schematic block diagram of a server according to another embodiment of the present invention.

FIG. 19 is a schematic block diagram of a server 1500 according to an embodiment of the present invention. As shown in FIG. 19, the server 1500 includes a processor 1510, a sender 1520, and a receiver 1530, where the processor 1510 is configured to instruct the sender 1520 to send a first user equipment reachability notification request message to a home subscriber server or home location register to which a user equipment belongs, so that the home subscriber server or the home location register sends a second user equipment reachability notification request message to a core network control entity to which the user equipment belongs, and therefore the core network control entity sets first indication information according to the second user equipment reachability notification request message, where the first indication information indicates that the server buffers downlink data to be sent to the user equipment;

the sender 1520 is configured to send, according to the instruction of the processor 1510, the first user equipment reachability notification request message to the home subscriber server or home location register to which the user equipment belongs;

the receiver 1530 is configured to receive a second user equipment reachability notification message that is sent by the home subscriber server or the home location register after the home subscriber server or the home location register receives a first user equipment reachability notification message that is sent by the core network control entity according to the first indication information;

the processor 1510 is further configured to instruct, according to the second user equipment reachability notification message received by the receiver, the sender 1520 to send the downlink data to the user equipment; and the sender 1520 is further configured to send the downlink data to the user equipment according to the instruction of the processor 1510.

Alternatively, the processor 1510 is configured to instruct the sender 1520 to send data buffering indication information to a core network control entity to which a user equipment belongs, so that the core network control entity sets first indication information according to the data buffering indication information, where the data buffering indication information indicates that the server buffers downlink data to be sent to the user equipment and the first indication information indicates that the server buffers the downlink data to be sent to the user equipment;

the sender 1520 is configured to send, according to the instruction of the processor 1510, the data buffering indication information to the core network control entity to which the user equipment belongs;

the receiver 1530 is configured to receive a downlink data delivery request message that is sent by the core network control entity according to the first indication information;

the processor 1510 is further configured to instruct, according to the downlink data delivery request message received by the receiver 1530, the sender 1520 to send the downlink data to the user equipment; and the sender 1520 is further configured to send the downlink data to the user equipment according to the instruction of the processor 1510.

Optionally, the processor 1510 is further configured to: when determining that the downlink data expires, instruct the sender 1520 to send a second user equipment reachability notification cancellation message to the home subscriber server or the home location register, so that the home subscriber server or the home location register sends a first user equipment reachability notification cancellation message to the core network control entity, and therefore the core network control entity deletes the first indication information according to the first user equipment reachability notification cancellation message; and the sender 1520 is further configured to send the second user equipment reachability notification cancellation message to the home subscriber server or the home location register according to the instruction of the processor 1510.

Optionally, the first user equipment reachability notification request message further includes a validity period of the downlink data, so that the home subscriber server sends a first user equipment reachability notification cancellation message to the core network control entity when determining, according to the first user equipment reachability notification request message, that the validity period of the downlink data expires, and therefore the core network control entity deletes the first indication information according to the first user equipment reachability notification cancellation message.

Optionally, the processor 1510 is further configured to: when determining that a validity period of the downlink data expires, instruct the sender 1520 to send a fourth message to the core network control entity, where the fourth message is used to instruct the core network control entity to delete the first indication information; and the sender 1520 is further configured to send the fourth message to the core network control entity according to the instruction of the processor.

Optionally, the data buffering indication information further includes a validity period of the downlink data, so that the core network control entity sets the first indication information that is further used to indicate the validity period of the downlink data, and deletes the first indication information when the validity period of the downlink data expires.

Therefore, the server according to the embodiment of the present invention sends the first user equipment reachability notification request message to the home subscriber server or the home location register, so that the home subscriber server or the home location register sends the second user equipment reachability notification request message to the core network control entity, and therefore the core network control entity sets the first indication information according to the second user equipment reachability notification request message, where the first indication information indicates that the server buffers the downlink data to be sent to the user equipment, and the server sends the downlink data to the user equipment when receiving a second user equipment reachability notification response message that is sent by the home subscriber server or the home location register after the home subscriber server or the home location register receives a first user equipment reachability notification response message that is sent by the core network control entity according to the first indication information; or sends the data buffering indication information to the core network control entity, so that the core network control entity sets the first indication information according to the data buffering indication information, where the data buffering indication information indicates that the downlink data to be sent to the user equipment is buffered and the first indication information indicates that another entity has downlink data to be sent to the user equipment, and the another entity sends the downlink data to the user equipment when receiving a request message that is sent by the core network control entity according to the first indication information and triggers the downlink data, which can save power of the user equipment.

It should be understood that, features of the method embodiments of the present invention are applicable to the device embodiments of the present invention in appropriate cases, and vice versa.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data comprising:
    determining, by a core network control entity, after receiving a first message sent by a user equipment, whether first indication information is set, wherein the first indication information indicates that a server buffers downlink data to be sent to the user equipment;
    when the first indication information is determined to be set, retaining a signaling connection from the core network control entity to the user equipment for a predetermined time based on user equipment subscription data or a network configuration;
    sending to the user equipment a second message when a preset duration in which the signaling connection can be retained is less than a predetermined threshold, where the second message comprises second indication information indicating there is data to be sent to the user equipment, thereby retaining the signaling connection to the user equipment;
    triggering the server that buffers the downlink data to send the downlink data to the core network control entity;
    receiving the downlink data at the core network control entity;
    sending the downlink data from the core network control entity to the user equipment by a Non-Access Stratum (NAS) message using the signaling connection so that the user equipment waits to receive the downlink data during the predetermined time; and
    entering an idle mode at the user equipment after the predetermined time expires.

2. The method according to claim 1, wherein triggering the server to send the downlink data to the user equipment comprises:
    sending a downlink data delivery request message to the server so as to trigger the server to send the downlink data to the user equipment.

3. The method according to claim 1, wherein triggering the server to send the downlink data to the user equipment comprises:
    sending a first user equipment reachability notification message to a home subscriber server or home location register to which the user equipment belongs, to enable the home subscriber server or the home location register to send a second user equipment reachability notification message to the server so as to trigger the server to send the downlink data to the user equipment.

4. The method according to claim 1, wherein before determining whether the first indication information is set, the method further comprises:
    receiving data buffering indication information sent by the server, wherein the data buffering indication information indicates that the server buffers the downlink data to be sent to the user equipment, and
    setting the first indication information according to the data buffering indication information.

5. The method according to claim 1, wherein before determining whether the first indication information is set, the method further comprises:
    sending a context response message from the core network control entity serving the user equipment; and
    when the context response message comprises the first indication information, setting the first indication information.

6. The method according to claim 1, wherein the core network control entity is a Mobile Management Entity (MME) or a Serving GPRS Supporting Node (SGSN).

7. The method of according to claim 1, wherein the first indication information is associated with a validity period of the downlink data and the first indication information is deleted after expiration of the validity period if the downlink data has not been sent to the user equipment.

8. The method according to claim 1, wherein before determining whether the first indication information is set, the method further comprises:
receiving a second user equipment reachability notification request message sent by a home subscriber server or home location register to which the user equipment belongs after the home subscriber server or home location register receives a first user equipment reachability notification request message, and
setting the first indication information according to the second user equipment reachability notification request message.

9. A core network control entity comprising:
a processor; and
a memory coupled to the processor, the memory having processor-executable instructions stored thereon, which when executed causes the processor to implement operations including:
  a) after receiving a first message sent by a user equipment, determining whether first indication information is set, wherein the first indication information indicates that a server buffers downlink data to be sent to the user equipment;
  b) when it is determined that the first indication information is set, retaining a signaling connection from the core network control entity to the user equipment for a predetermined time based on user equipment subscription data or a network configuration;
  c) sending to the user equipment a second message when a preset duration in which the signaling connection can be retained is less than a predetermined threshold, where the second message comprises second indication information indicating there is data to be sent to the user equipment, thereby retaining the signaling connection to the user equipment;
  d) triggering the server that buffers the downlink data to send the downlink data to the core network control entity;
  e) receiving the downlink data at the core network control entity;
  f) sending the downlink data from the core network control entity to the user equipment by a Non-Access Stratum (NAS) message using the signaling connection so that the user equipment waits to receive the downlink data during the predetermined time; and
  g) entering an idle mode at the user equipment after the predetermined time expires.

10. The core network control entity according to claim 9, wherein the operations further comprise:
receiving a second user equipment reachability notification request message sent by a home subscriber server or home location register to which the user equipment belongs after the home subscriber server or home location register receives a first user equipment reachability notification request message, and
setting the first indication information according to the second user equipment reachability notification request message.

11. The core network control entity according to claim 9, wherein the operations further comprise:
receiving data buffering indication information sent by the server, wherein the data buffering indication information indicates that the server buffers the downlink data to be sent to the user equipment, and
setting the first indication information according to the data buffering indication information.

12. The core network control entity according to claim 9, wherein the operations further include:
sending a downlink data delivery request message to the server so as to trigger the server to send the downlink data to the user equipment.

13. The core network control entity according to claim 9, wherein the operations further include:
sending a first user equipment reachability notification message to a home subscriber server or home location register to which the user equipment belongs, to enable the home subscriber server or the home location register to send a second user equipment reachability notification message to the server so as to trigger the server to send the downlink data to the user equipment.

14. The core network control entity according to claim 9, wherein the operations further comprise:
sending a context response message and, when the context response message comprises the first indication information, setting the first indication information.

15. The core network control entity according to claim 9, wherein the core network control entity is a Mobile Management Entity (MME) or a Serving GPRS Supporting Node (SGSN).

16. The core network control entity according to claim 9, wherein the first indication information is associated with a validity period of the downlink data and the first indication information is deleted after expiration of the validity period if the downlink data has not been sent to the user equipment.

* * * * *